US012722256B2

(12) United States Patent
Nick

(10) Patent No.: US 12,722,256 B2
(45) Date of Patent: Sep. 1, 2026

(54) RATCHETING TOOL

(71) Applicant: MILWAUKEE ELECTRIC TOOL CORPORATION, Brookfield, WI (US)

(72) Inventor: Mackenzie J. Nick, Theresa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 17 days.

(21) Appl. No.: 18/201,290

(22) Filed: May 24, 2023

(65) Prior Publication Data

US 2023/0294255 A1 Sep. 21, 2023

Related U.S. Application Data

(63) Continuation of application No. 16/527,210, filed on Jul. 31, 2019, now Pat. No. 11,691,254.

(60) Provisional application No. 62/712,670, filed on Jul. 31, 2018.

(51) Int. Cl.
*B25B 21/00* (2006.01)
*B25B 13/46* (2006.01)

(52) U.S. Cl.
CPC .......... *B25B 21/004* (2013.01); *B25B 13/463* (2013.01)

(58) Field of Classification Search
CPC ..... B25B 21/004; B25B 13/463; B25B 13/12; B25B 13/24; B25B 13/26; B25B 13/38; B25B 13/40; B25B 13/481; B25F 5/02; B25G 3/12
USPC .............................. 81/57.11–57.46, 62–63.1
See application file for complete search history.

(56) References Cited

U.S. PATENT DOCUMENTS 2,107,568 A 2/1938 Haist
4,300,413 A 11/1981 Garofalo
4,406,183 A 9/1983 Wix
4,445,404 A * 5/1984 Parker .................. B25B 13/463 81/62
4,589,307 A 5/1986 Parker
(Continued)

FOREIGN PATENT DOCUMENTS

FR 2926033 A1 7/2009

OTHER PUBLICATIONS

Extended European Search Report for Application No. 19843990.3 dated Jun. 20, 2022 (8 pages).
(Continued)

*Primary Examiner* — Brian D Keller
*Assistant Examiner* — Jason Khalil Hawkins
(74) *Attorney, Agent, or Firm* — Michael Best & Friedrich LLP

(57) ABSTRACT

A powered ratchet tool includes a housing, an output member having a toothed surface, and a drive mechanism for driving the output member. The drive mechanism includes a yoke in which the output member is arranged. A first pawl is in the yoke and is biased toward the toothed surface of the output member and a second pawl is in the yoke and is biased toward the toothed surface of the output member. A selection ring having a circumferential wall is arranged between the yoke and the toothed surface of the output member. The circumferential wall has a first window and a second window and the selection ring is moveable between a first position and a second position. The selection ring also includes a tab extending radially outward from the circumferential wall and the housing for moving the selection ring between the first and second positions.

20 Claims, 17 Drawing Sheets

(56) References Cited

U.S. PATENT DOCUMENTS

| | | | | |
|---|---|---|---|---|
| 5,058,463 | A * | 10/1991 | Wannop | B25B 13/467 81/62 |
| 5,450,773 | A | 9/1995 | Darrah et al. | |
| 5,622,089 | A | 4/1997 | Gifford, Sr. | |
| 5,738,192 | A | 4/1998 | Miner | |
| 6,282,990 | B1 | 9/2001 | Miner | |
| 6,457,386 | B1 * | 10/2002 | Chiang | B25B 13/467 81/62 |
| 6,810,773 | B2 * | 11/2004 | Trucchio | B25B 17/00 81/57.32 |
| 7,454,997 | B2 * | 11/2008 | Putney | B25B 13/466 81/58.3 |
| 9,266,226 | B2 | 2/2016 | Timmons | |
| 9,321,154 | B2 * | 4/2016 | Chen | B25B 21/02 |
| 2006/0219060 | A1 | 10/2006 | Miner | |
| 2010/0288082 | A1 | 11/2010 | Huang | |
| 2012/0180603 | A1 | 7/2012 | Hu | |
| 2015/0224633 | A1 | 8/2015 | Alavi | |
| 2016/0121463 | A1 | 5/2016 | Troy et al. | |
| 2016/0138657 | A1 | 5/2016 | Chen | |

OTHER PUBLICATIONS

Chinese Patent Office Action for Application No. 201990001052.7 dated Oct. 22, 2021 (5 pages including statement of relevance).

International Search Report and Written Opinion for Application No. PCT/US2019/044272, dated Nov. 20, 2019 (15 pages).

European Patent Office Action for Application No. 19843990.3 dated Aug. 7, 2024 (4 pages).

* cited by examiner

RATCHETING TOOL

CROSS-REFERENCE TO RELATED APPLICATIONS

This application is a continuation of U.S. application Ser. No. 16/527,210 filed Jul. 31, 2019, now U.S. Pat. No. 11,691,254, which claims priority to U.S. Provisional Patent Application No. 62/712,670 filed Jul. 31, 2018, the entire contents of which is incorporated herein by reference.

FIELD OF THE INVENTION

The present invention relates to ratchet tools, and more particularly to powered ratcheting tools.

BACKGROUND OF THE INVENTION

Powered ratchet tools sometimes give an operator to drive the tool in a forward direction or an opposite reverse direction to apply torque to a fastener for tightening or loosening the fastener. Powered ratchet tools are typically powered by an electrical source, such as a DC battery, a conventional AC source, or pressurized air. Powered ratchet tools are constructed of components such as a drive mechanism including a motor and an output member for applying torque to the fastener.

SUMMARY OF THE INVENTION

The present invention provides, in one aspect, a powered ratchet tool comprising a housing, an output member having a toothed surface, and a drive mechanism for driving the output member. The drive mechanism includes a yoke in which the output member is arranged. The powered ratchet tool further comprises a first pawl in the yoke and biased toward the toothed surface of the output member and a second pawl in the yoke and biased toward the toothed surface of the output member. The powered ratchet tool further comprises a selection ring having a circumferential wall arranged between the yoke and the toothed surface of the output member. The circumferential wall has a first window and a second window and the selection ring is moveable between a first position and a second position. The selection ring also includes a tab extending radially outward from the circumferential wall and the housing for moving the selection ring between the first and second positions. When the selection ring is in the first position, the first pawl extends through the first window to engage the toothed surface of the output member and the second pawl is blocked by the circumferential wall, such that the second pawl does not engage with the toothed surface of the output member. When the selection ring is in the second position, the second pawl extends through the second window to engage the toothed surface of the output member and the first pawl is blocked by the circumferential wall, such that the first pawl does not engage with the toothed surface of the output member.

The present invention provides, in another aspect, a powered ratchet tool comprising a housing, an output member defining an output axis, and a drive gear for driving the output member. The drive gear defines a drive axis that is transverse to the output axis and has an inner toothed surface. The powered ratchet tool further comprises a drive mechanism for driving the drive gear. The drive mechanism includes a drive shaft arranged along the drive axis. The powered ratchet tool further comprises a first pawl in the drive shaft and biased toward the inner toothed surface of the drive gear and a second pawl in the drive shaft and biased toward the inner toothed surface of the drive gear. The powered ratchet tool further comprises a selection ring arranged about the drive shaft and including an inner circumferential wall having a first pawl recess and a second pawl recess. The selection ring is moveable between a first position and a second position. When the selection ring is in the first position, the first pawl is biased into engagement with the first pawl recess and the inner toothed surface of the drive gear, and the second pawl is blocked by the inner circumferential wall, such that the second pawl does not engage with the inner toothed surface of the drive gear. When the selection ring is in the second position, the second pawl is biased into engagement with the second pawl recess and the inner toothed surface of the drive gear, and the first pawl is blocked by the inner circumferential wall, such that the first pawl does not engage with the inner toothed surface of the drive gear.

The present invention provides, in yet another aspect, an output member assembly of a ratchet tool comprising an output member having a first opening with a first shape and an insert configured to be removably positioned in the first opening. The insert has a second opening with a second shape that is different than the first shape. The output member assembly further comprises a locking member in one of the output member or the insert. The other of the output member or the insert includes a groove configured to receive the locking member when the insert is received in the first opening, such that the insert is retained in the first opening absent an external force being applied to the insert or the locking member.

The present invention provides, in yet another aspect, an output member assembly of a ratchet tool comprising an output member having a first opening with a first shape having a first size and an insert configured to be removably positioned in the first opening. The insert has a second opening with the first shape and a second size that is different than the first size. The output member assembly further comprises a locking member in one of the output member or the insert. The other of the output member or the insert member includes a groove configured to receive the locking member when the insert is received in the first opening, such that the insert is retained in the first opening absent an external force being applied to the insert or the locking member Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
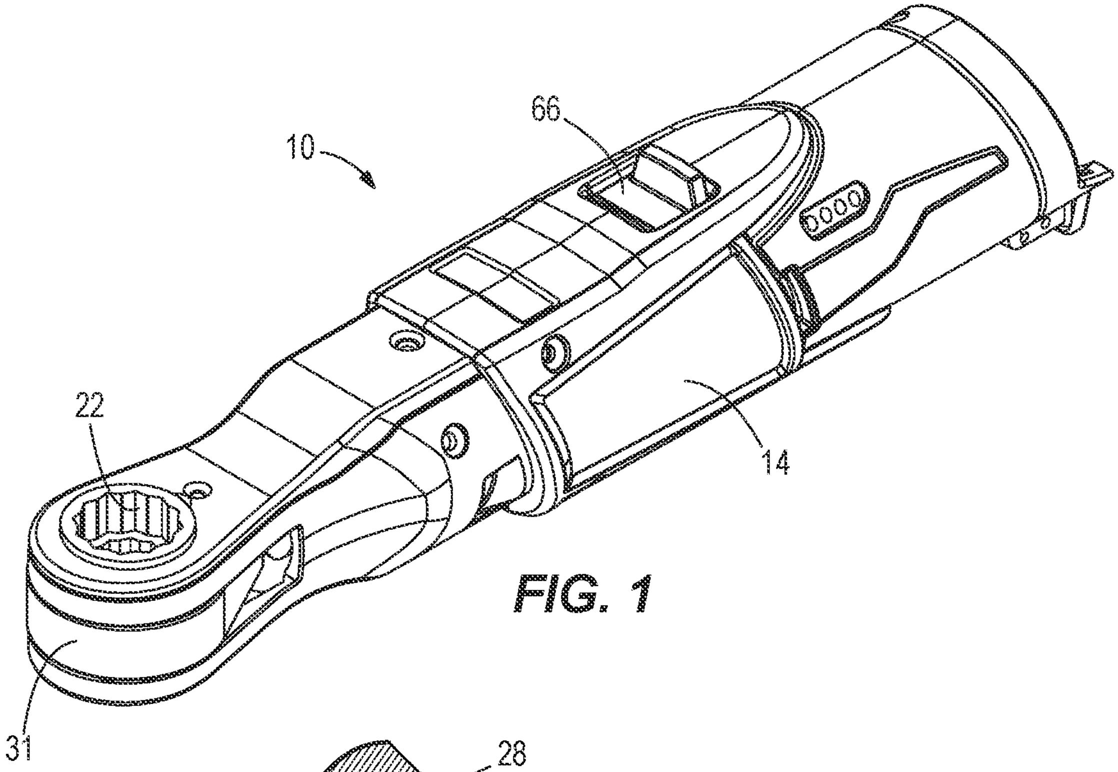
FIG. 1 is a perspective view of a ratchet tool.
Figure 2:
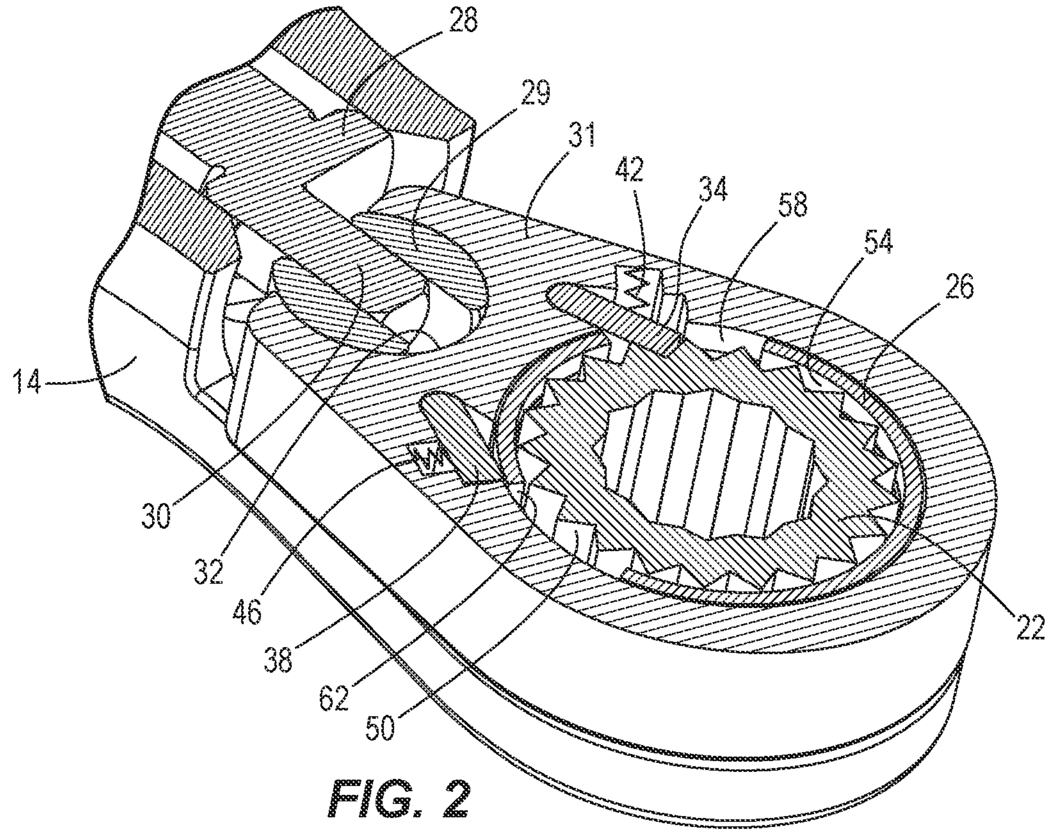
FIG. 2 is a cross-sectional view of the ratchet tool of FIG. 1.
Figure 4:
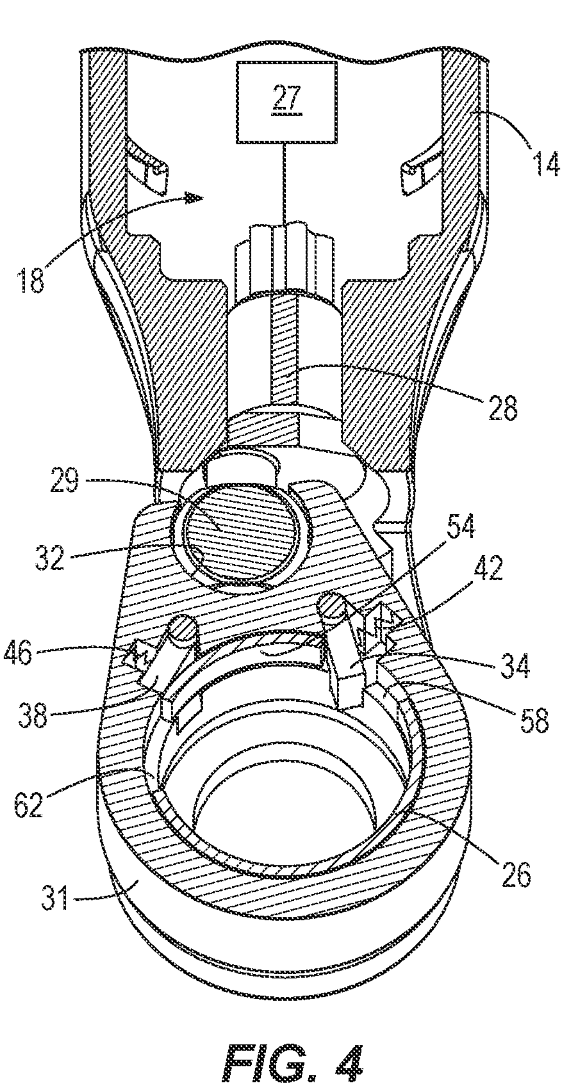
FIG. 4 is a cross-sectional view of the ratchet tool of FIG. 1 with a selection ring in a first position and with portions removed.
Figure 5:
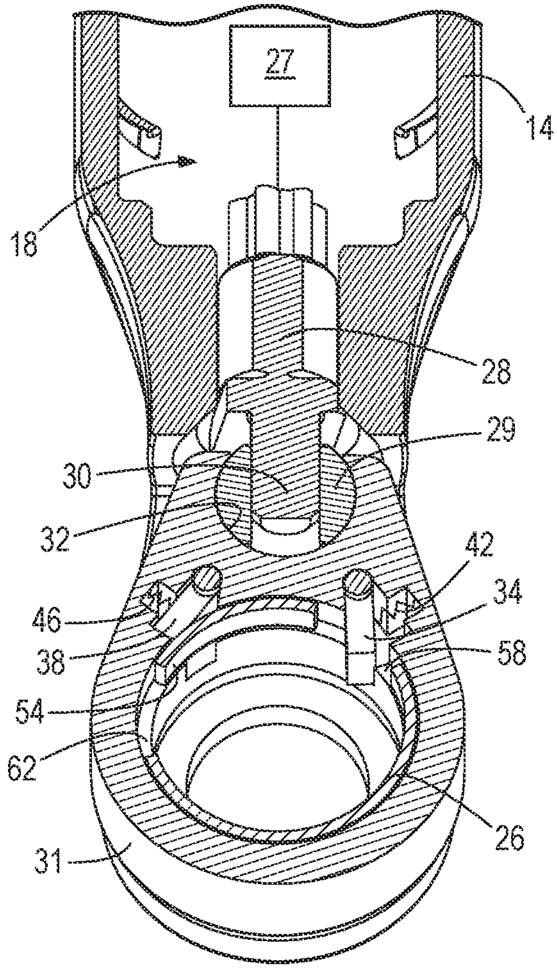
FIG. 5 is a cross-sectional view of the ratchet tool of FIG. 1 with a selection ring in a first position and with portions removed.
Figure 6:
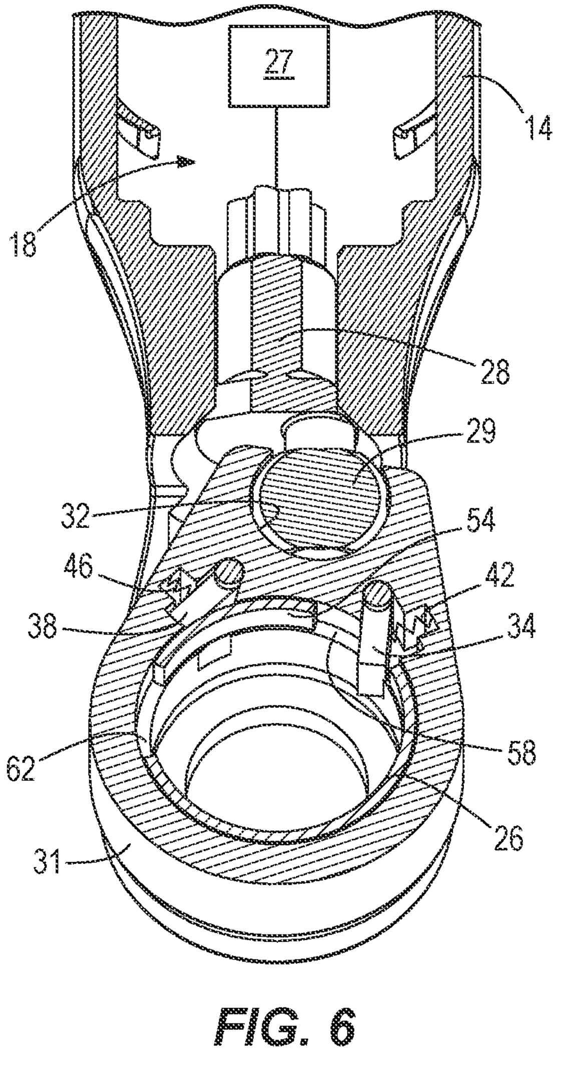
FIG. 6 is a cross-sectional view of the ratchet tool of FIG. 1 with a selection ring in a first position and with portions removed.
Figure 7:
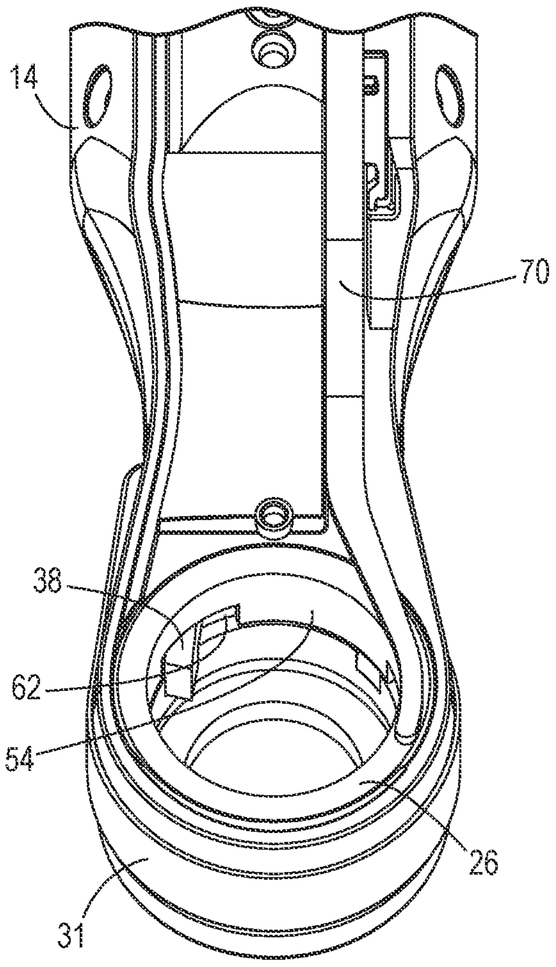
FIG. 7 is a perspective view of the ratchet tool of FIG. 1 with a selection ring in a second position and with portions removed.
Figure 8:
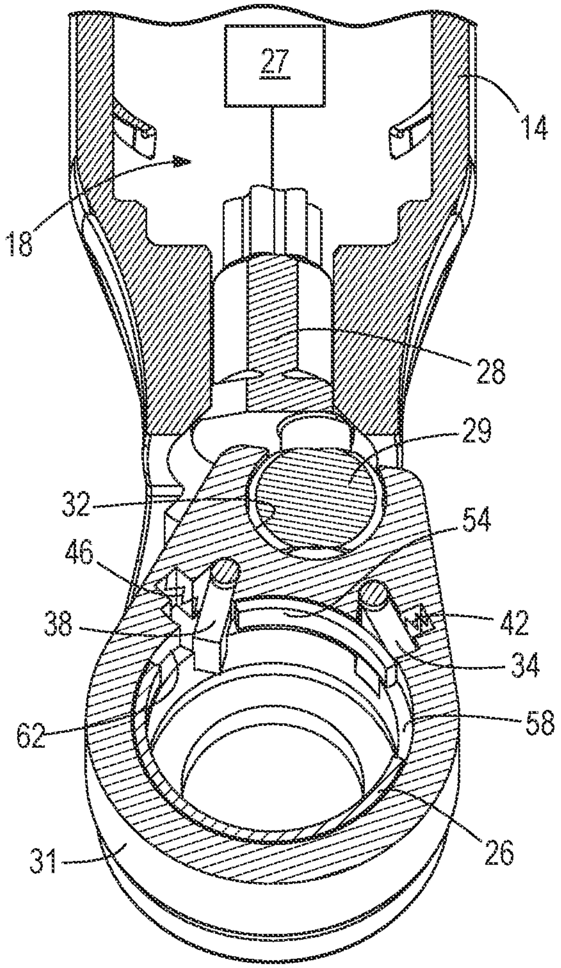
FIG. 8 is a cross-sectional view of the ratchet tool of FIG. 1 with a selection ring in a second position and with portions removed.
Figure 9:
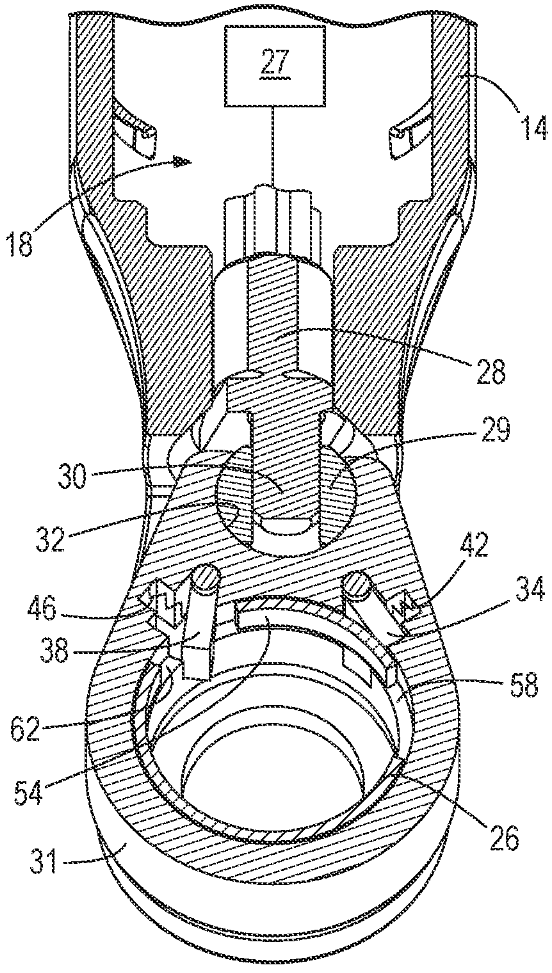
FIG. 9 is a cross-sectional view of the ratchet tool of FIG. 1 with a selection ring in a second position and with portions removed.
Figure 10:
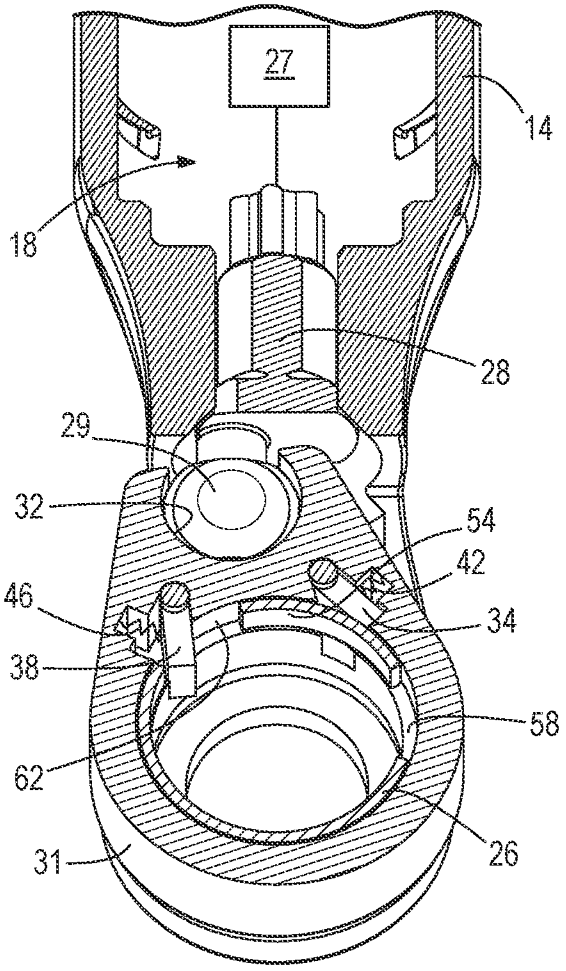
FIG. 10 is a cross-sectional view of the ratchet tool of FIG. 1 with a selection ring in a second position and with portions removed.

A shown in FIGS. 1 and 4, a powered ratchet tool 10 includes a housing 14 and a drive mechanism 18 for driving an output member 22 used to tighten or loosen fasteners (e.g., nuts or bolts). As shown in FIG. 2, the ratchet tool 10 also includes a selection ring 26 for selecting between forward (clockwise as viewed in FIGS. 1 and 2) rotation of the output member 14 and reverse (counterclockwise as viewed in FIGS. 1 and 2) rotation of the output member 22. The drive mechanism 18 includes a motor (not shown) and a transmission 27 terminating in a crankshaft 28 having a drive bushing 29 arranged eccentrically on an end 30 of the crankshaft 28, as shown in FIG. 4. The drive mechanism 18 also includes a yoke 31 through which the output member 22 extends. The yoke 31 has a recess 32 in which the drive bushing 29 is arranged. As explained in further detail below, when the crankshaft 28 rotates, the drive bushing 29 pivots the yoke 31 in a reciprocating manner, relative to the selection ring 26, to drive the output member 22.

With reference to FIG. 2, the ratchet tool 10 also includes a first pawl 34 and a second pawl 38 in the yoke 31. The first and second pawls 34, 38 are biased by first and second springs 42, 46, respectively, toward an outer toothed surface 50 of the output member 22. As shown in FIG. 2, the selection ring 26 has circumferential wall 54 arranged between the yoke 31 and the toothed surface 50. The circumferential wall 54 has a first window 58 and a second window 62.

Figure 3:
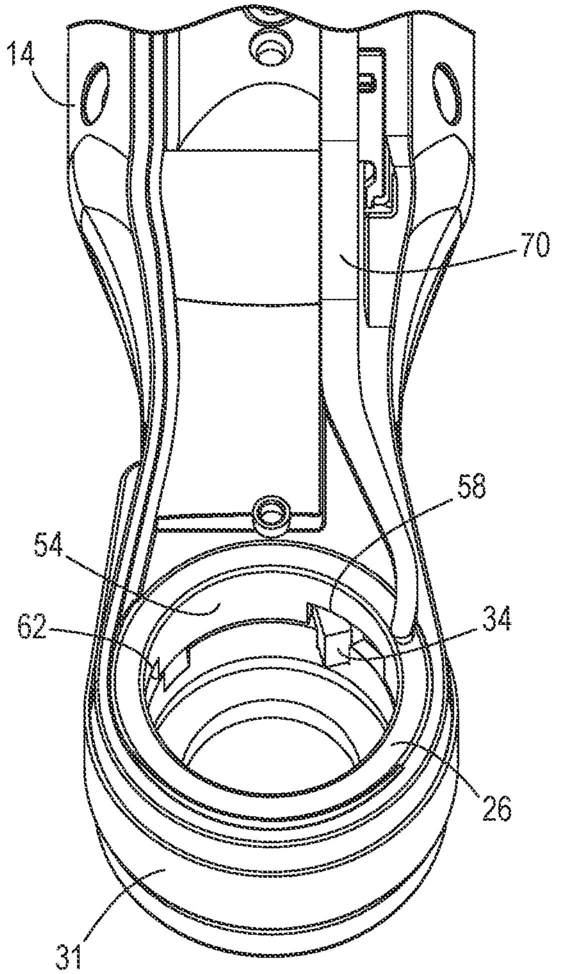
FIG. 3 is a perspective view of the ratchet tool of FIG. 1 with a selection ring in a first position and with portions removed.

As shown in FIGS. 1 and 3, the ratchet tool 10 includes an actuator 66 on the housing and a linkage 70 coupling the actuator 66 to the selection ring 26. In the illustrated embodiment, the actuator 66 is a slide switch for translating the linkage 70, which in turn rotates the selection ring 26 between a first position corresponding to a "forward driving mode" and shown in FIGS. 2-6 and a second position corresponding to a "reverse driving mode" and shown in FIGS. 7-10. When the selection ring 26 is in the first position, the first pawl 34 extends through the first window 58 to engage the toothed surface 50 of the output member 22 and the second pawl 38 is blocked by the circumferential wall 54, such that the second pawl 38 does not engage with the toothed surface 50 of the output member 22. When the selection ring 26 is in the second position, the second pawl 38 extends through the second window 62 to engage the toothed surface 50 of the output member 22 and the first pawl 34 is blocked by the circumferential wall 54, such that the first pawl 34 does not engage with the toothed surface 50 of the output member 22.

In operation, when an operator wishes to tighten a fastener and drive the output member 22 of the ratchet tool 10 in a forward direction, the operator moves the actuator 66 to a "forward" selection position, which causes the linkage 70 to rotate the selection ring 26 to the first position shown in FIGS. 2-6, resulting in the first pawl 34 engaging with the toothed surface 50 of the output member 22. The operator then actuates the drive mechanism 18, causing the crank-shaft 28 to rotate the drive bushing 29, which causes the yoke 31 to pivot in a reciprocating manner relative to the housing 14 and the selection ring 26. As the yoke 31 is undergoing a "forward driving" pivot motion, from the position in FIG. 4 to the position in FIG. 5 to the position in FIG. 6, the first pawl 34 starts on the inner side of the first window 58 (FIG. 4) and moves to the outer side of the first window 58 (FIG. 6) while maintaining engagement with a pair of adjacent teeth on the toothed surface 50 of the output member 22, thus transferring torque from the yoke 31 to the output member 22, causing the output member 22 to rotate clockwise, as viewed in FIG. 2. As the crankshaft 28 continues to rotate the drive bushing 29, the yoke 31 undergoes a "forward ratcheting" pivot motion, and moves back from the position in FIG. 6 to the position in FIG. 5 and to the position in FIG. 4, causing the first pawl 38 to ratchet back across the toothed surface 50 of the output member 22 from the outer side of the first window 58 (FIG. 6) to the inner side of the first window 58 (FIG. 4), thus not transferring any torque to the output member 22. Once the yoke 31 has returned to the position in FIG. 4, the yoke 31 will begin another "forward driving" pivot motion to again transfer torque to the output member 22, as described above. During operation in "forward driving mode", the second pawl 38 has no interaction with the toothed surface 50 of the output member 22 because the selection ring 26 is in the first position and the second pawl 38 is blocked by the circumferential wall 54 of the selection ring 26.

In operation, when an operator wishes to loosen a nut and drive the output member 22 of the ratchet tool 10 in a reverse direction, the operator moves the actuator 66 to a "reverse" selection position, which causes the linkage 70 to rotate the selection ring 26 to the second position shown in FIGS. 7-10, resulting in the second pawl 38 engaging with the toothed surface 50 of the output member 22. The operator then actuates the drive mechanism 18, causing the crankshaft 28 to rotate the drive bushing 29, which causes the yoke 31 to pivot in a reciprocating manner relative to the housing 14 and the selection ring 26. As the yoke 31 is undergoing a "reverse driving" pivot motion, from the position in FIG. 8 to the position in FIG. 9 to the position in FIG. 10, the second pawl 38 starts on the inner side of the second window 62 (FIG. 8) and moves to the outer side of the second window 62 (FIG. 10) while maintaining engagement with a pair of adjacent teeth on the toothed surface 50 of the output member 22, thus transferring torque from the yoke 31 to the output member 22, causing the output member 22 to rotate counterclockwise as viewed in FIG. 2. As the crankshaft 28 continues to rotate the drive bushing 29, the yoke 31 undergoes a "reverse ratcheting" pivot motion, and moves back from the position in FIG. 10 to the position in FIG. 9 and to the position in FIG. 8, causing the second pawl 38 to ratchet back across the toothed surface 50 of the output member 22 from the outer side of the second window 62 (FIG. 10) to the inner side of the second window 62 (FIG. 8), thus not transferring any torque to the output member 22. Once the yoke 31 has returned to the position in FIG. 8, the yoke 31 will begin another "reverse driving" pivot motion to again transfer torque to the output member 22, as described above. During operation in "reverse driving mode", the first pawl 34 has no interaction with the toothed surface 50 of the output member 22 because the selection ring 26 is in the second position and the first pawl 34 is blocked by the circumferential wall 54 of the selection ring 26.

Figure 11:
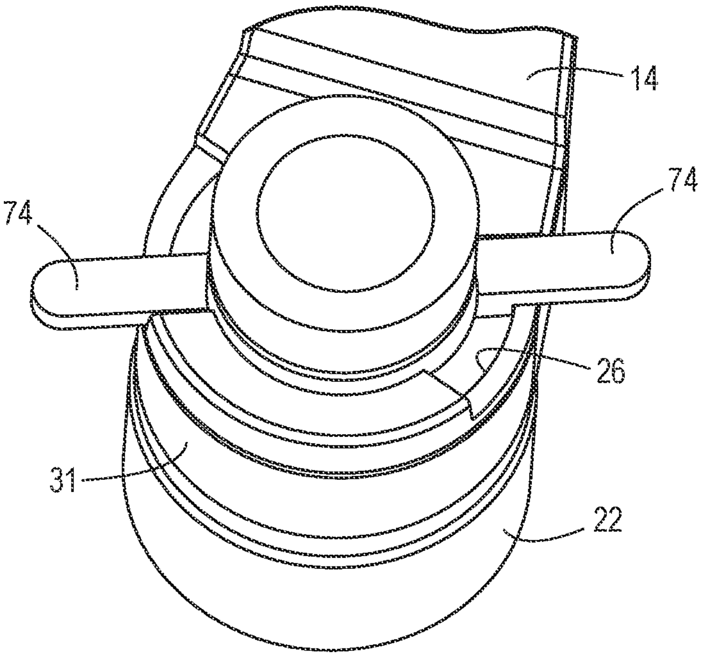
FIG. 11 is a perspective view of a different embodiment of a selection ring of the ratchet tool of FIG. 1, with the selection ring in a first position.
Figure 12:
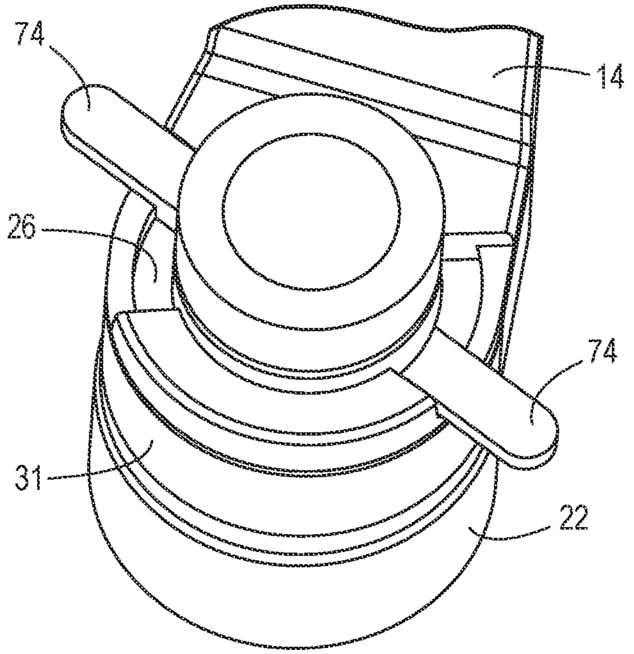
FIG. 12 is a perspective view of the selection ring of FIG. 11, with the selection ring in a second position.

In another embodiment of the ratchet tool 10 shown in FIGS. 11 and 12, with like features shown with like reference numerals, the tool 10 does not include a remote actuator 66 or linkage 70. Instead, one or more tabs 74 extend from the selection ring 26 and out of the housing 14. Thus, the operator may directly grasp either of the tabs 74 to rotate the selection ring 26 from the first "forward driving" position (FIG. 11) to the second "reverse driving" position (FIG. 12).

Figure 13:
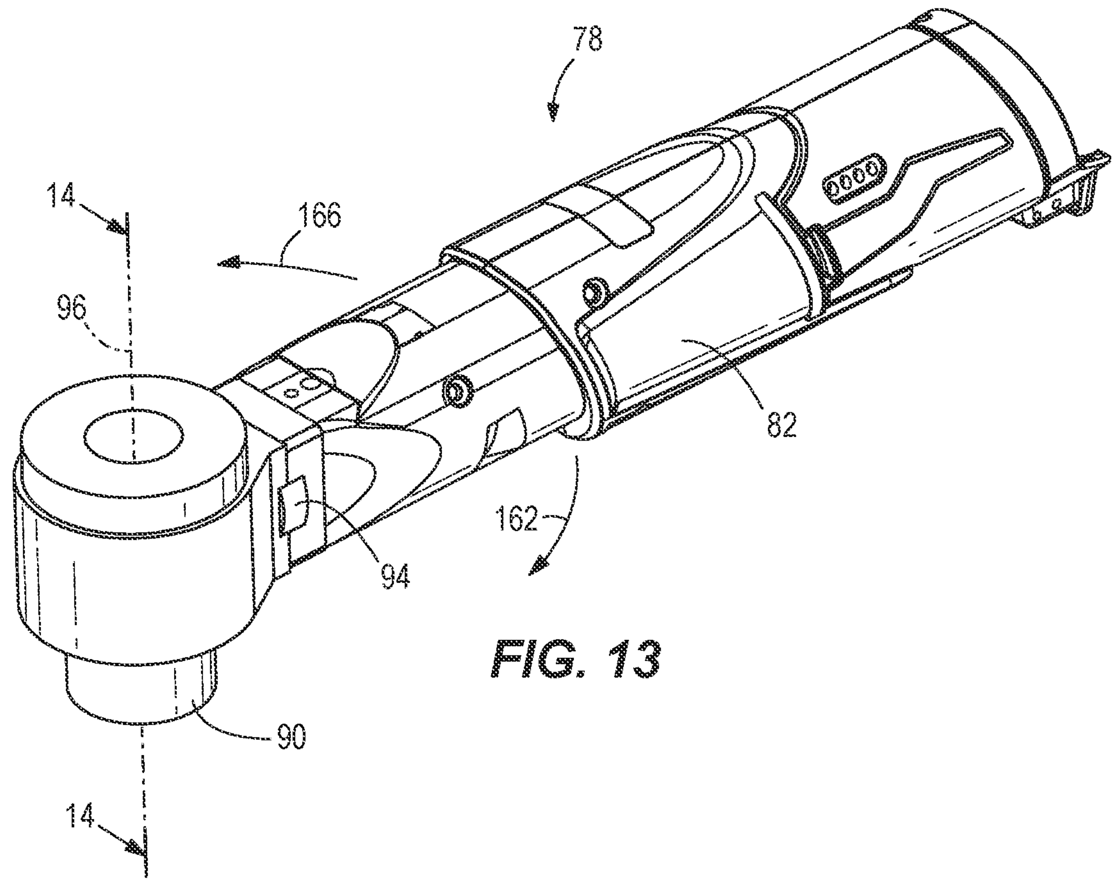
FIG. 13 is a perspective view of another embodiment of a ratchet tool.
Figure 14:
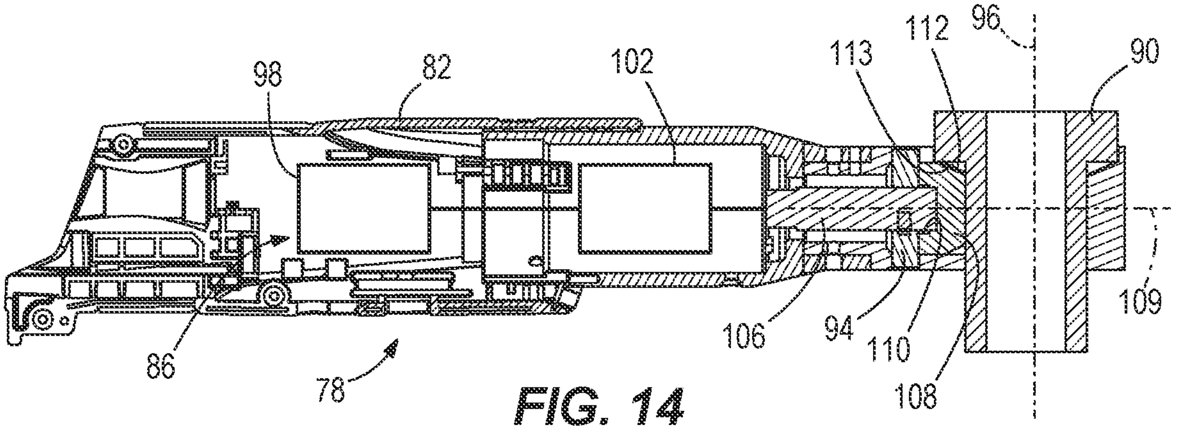
FIG. 14 is a cross-sectional view of the ratchet tool of FIG. 13.
Figure 15:
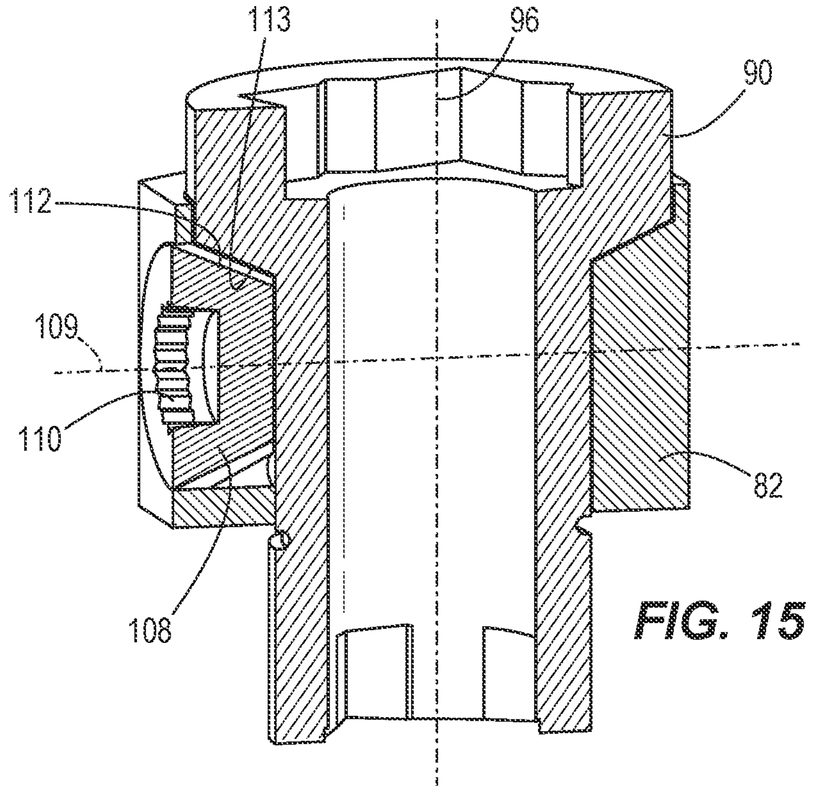
FIG. 15 is an enlarged cross-sectional view of the ratchet tool of FIG. 13, with portions removed.
Figure 16:
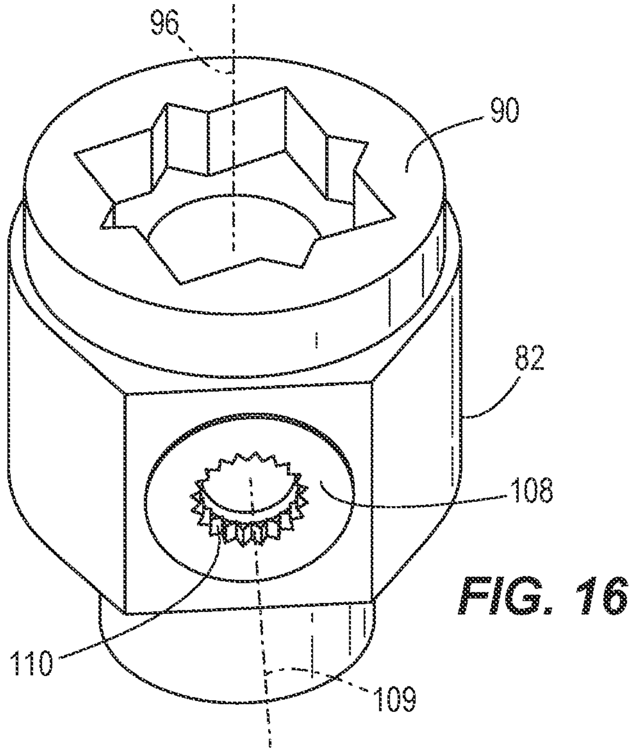
FIG. 16 is a perspective view of the ratchet tool of FIG. 13, with portions removed.

Another embodiment of a powered ratchet tool 78 is shown in FIGS. 13-23. As shown in FIGS. 13 and 14, the ratchet tool 78 includes a housing 82 and a drive mechanism 86 for driving an output member 90 used to tighten or loosen fasteners (e.g., nuts or bolts). The ratchet tool 78 also includes a selector 94 for selecting between forward (clockwise as viewed in FIG. 13) rotation of the output member 90 and reverse (counterclockwise as viewed in FIG. 13) rotation of the output member 90 about an output axis 96 defined by the output member 90. With reference to FIG. 14, the drive mechanism 86 includes a motor 98 and a transmission 102 terminating in a driveshaft 106, which drives a drive gear 108 for transferring torque from the motor 98 to the output member 90, as explained in further detail below. The drive gear 108 defines a drive axis 109 that is transverse to the output axis 96. The driveshaft 106 is arranged along the drive axis 109. The drive gear 108 is axially adjacent the selector 94 and includes an inner toothed portion 110 and an outer toothed portion 112 that engages a toothed portion 113 of the output member 90 (FIG. 15).

Figure 17:
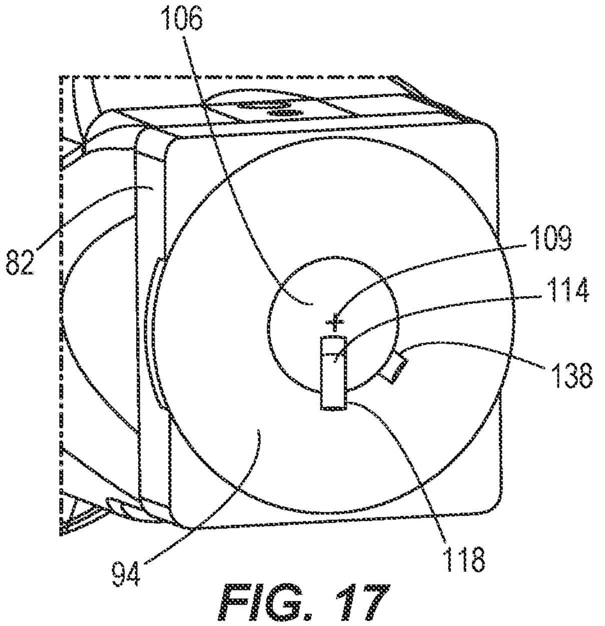
FIG. 17 is a cross-sectional view of the ratchet tool of FIG. 13, with a selector in a first position.
Figure 18:
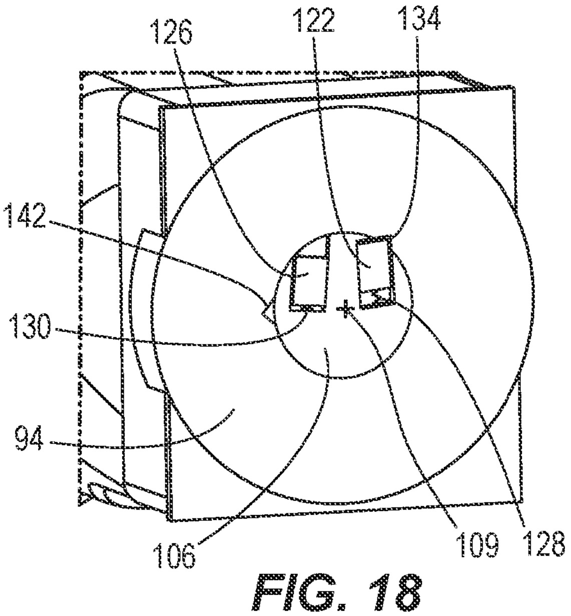
FIG. 18 is a cross-sectional view of the ratchet tool of FIG. 13, with a selector in a first position.
Figure 20:
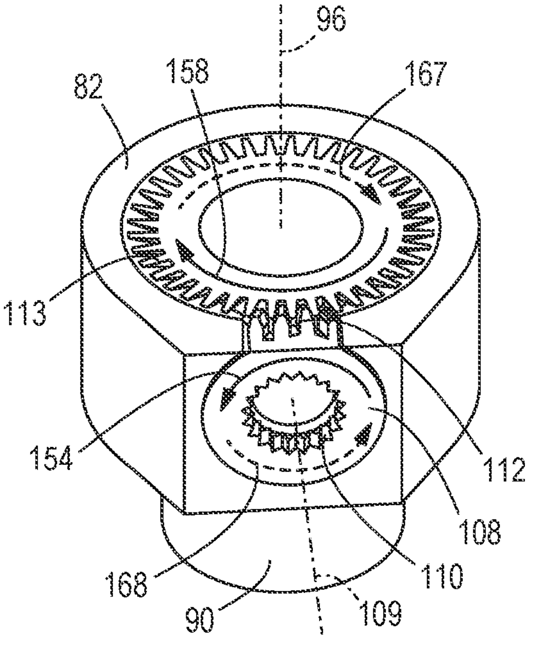
FIG. 20 is a cross-sectional view of the ratchet tool of FIG. 13, with a selector in a first position.
Figure 21:
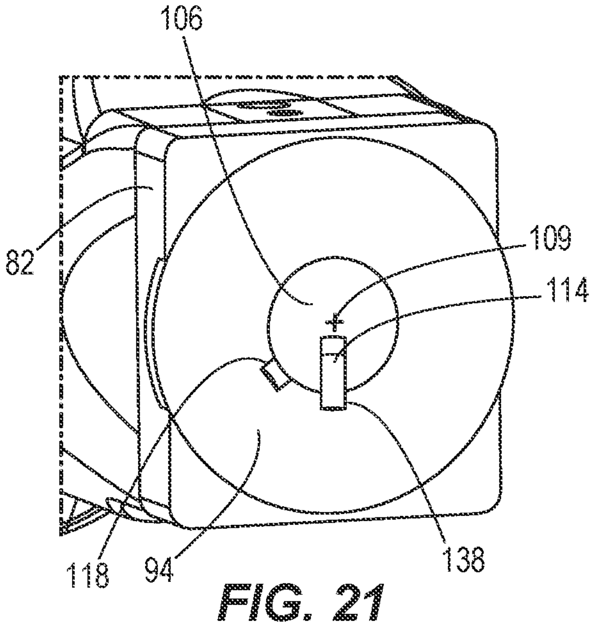
FIG. 21 is a cross-sectional view of the ratchet tool of FIG. 13, with a selector in a second position.
Figure 22:
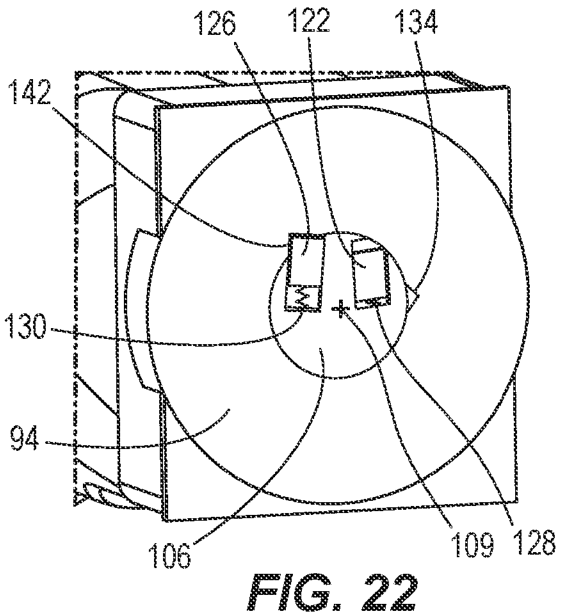
FIG. 22 is a cross-sectional view of the ratchet tool of FIG. 13, with a selector in a second position.

The selector 94 is moveable between a first position corresponding to a "forward driving mode" and shown in FIGS. 17 and 18 and a second position corresponding to a "reverse driving mode" and shown in FIGS. 20 and 21. As shown in FIG. 17, the selector 94 is maintained in the first position with respect to the drive shaft 106 via a pin 114 in the drive shaft 106 that is biased radially outward into a first detent 118 of the selector 94. While the pin 114 is in the first detent 118, the selector 94 is locked in the first position and locked for rotation with the drive shaft 106.

Figure 19:
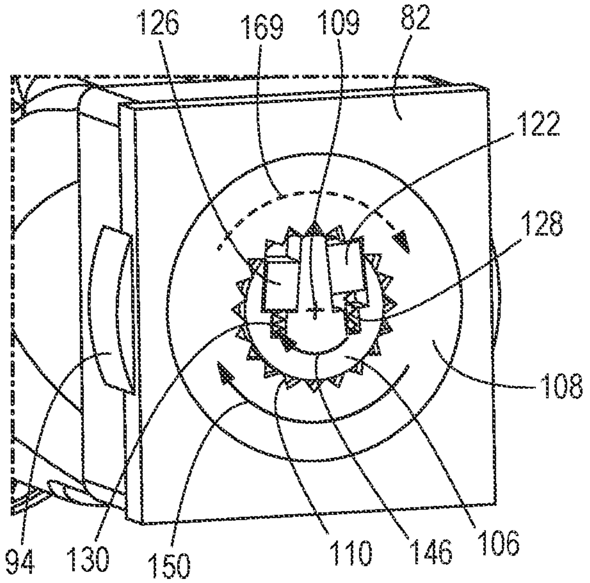
FIG. 19 is a cross-sectional view of the ratchet tool of FIG. 13, with a selector in a first position.

As shown in FIGS. 18, 19, 21 and 22, a first pawl 122 and a second pawl 126 are also arranged in the drive shaft 106 in a position that is axially offset from the pin 114. The first and second pawls 122, 126 are biased radially outward toward the selector 94 by first and second springs 128, 130, respectively. When the selector 94 is in the first position, the first pawl 122 is rotationally aligned with a first notch 134 of the selector 94. Thus, the first pawl 122 is biased by the first spring 128 into engagement with the first notch 134 of the selector 94 (FIG. 18) and the inner toothed portion 110 of the drive gear 108 (FIG. 19). Also, when the selector is in the first position, the second pawl 126 is blocked by the selector 94 and thus unable to protrude from drive shaft 106, as shown in FIG. 18. As a result, when the selector 94 is in the first position, the second pawl 126 is maintained disengaged from the drive gear 108.

Figure 23:
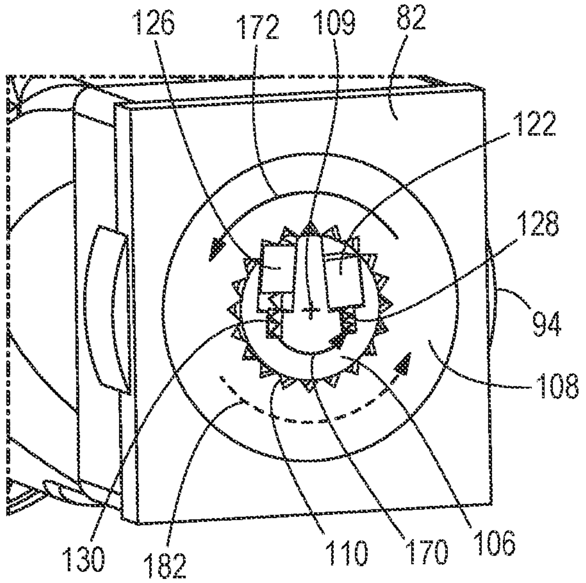
FIG. 23 is a cross-sectional view of the ratchet tool of FIG. 13, with a selector in a second position.

The selector 94 is switched to the second position by rotating the selector 94 about the drive shaft 106. Rotation of the selector 94 pushes the pin 114 away from the first detent 118 until the pin is out of the first detent 118, and continued rotation aligns the pin 114 with a second detent 138 of the selector 94, at which point the pin 114 is biased into the second detent 138, thus locking the selector 94 in the second position and locking the selector 94 for rotation with the drive shaft 106 (FIG. 20). Rotation of the selector 94 to the second position pushes the first pawl 122 away from the first notch 134 and the inner toothed portion 110 of the drive gear 108, such that when the selector 94 is in the second position, the first pawl 122 is maintained disengaged from the drive gear 108. When the selector 94 is in the second position, the second pawl 126 is rotationally aligned with a second notch 142 of the selector 94. Thus, the second pawl 126 is biased by the second spring 130 into engagement with the second notch 142 of the selector 94 (FIG. 22) and the inner toothed portion 110 of the drive gear 108 (FIG. 23).

In operation, when an operator wishes to tighten a nut and drive the output member 90 of the ratchet tool 78 in a forward direction, the operator rotates the selector 94 to the first position, resulting in the first pawl 122 engaging with the inner toothed portion 110 of the drive gear 108. The operator then actuates the motor 98 in a first, "forward" direction, causing the drive shaft 106 to rotate clockwise about the drive axis 109 as viewed in FIGS. 17-19 and indicated by arrow 146 in FIG. 19, causing the selector 94 to rotate therewith. Because the first pawl 122 is engaged with the inner toothed portion 110 of the drive gear 108, the drive gear 108 rotates in the same direction as the drive shaft 106, as indicated by arrow 150 in FIG. 19 and arrow 154 in FIG. 20. This causes the output member 90 to rotate clockwise ("forward") relative to housing 82 about the output axis 96, as viewed in FIG. 13 and indicated by arrow 158 in FIG. 20.

At some point, the operator may wish to manually tighten the nut forward without using the powered drive mechanism 86. Thus, the operator will perform a forward driving motion by rotating the housing 82 clockwise about the output axis 96 as indicated by arrow 162 in FIG. 13. Because the selector 94 is in the first position and the first pawl 122 is engaged with the inner toothed portion 110 of drive gear 108, drive gear 108 is prevented from rotating counter-clockwise, as viewed in FIG. 19, relative to the stationary drive shaft 106. Thus, as the housing 82 is rotated clockwise, the output member 90 is prevented from rotating counter-clockwise relative to housing 82, and instead is caused to rotate clockwise with the housing 82 as indicated by arrow 162 in FIG. 13. Thus, performing a forward driving motion while the selector 94 is in the first position allows an operator to use the output member 90 to transfer forward driving torque to the nut to manually tighten a nut.

After a forward driving motion, the operator needs to perform a reverse reset motion by rotating the housing 82 counterclockwise about the output axis 96, as indicated by arrow 166 in FIG. 13, before beginning another forward driving motion. Rotation of the housing 82 in a counter-clockwise direction causes the output member 90 to rotate clockwise relative to housing 82, as indicated by arrow 167 in FIG. 20, as the output member 90 remains fixed on the fastener and the housing 82 rotates counter-clockwise about the fastener. Because the selector 94 is in the first position, the drive gear 108 is allowed to rotate counter-clockwise about the drive axis 109, as indicated by arrow 168 in FIG. 20 (or clockwise about the drive axis 109, as indicated by arrow 169 in FIG. 19), relative to the stationary drive shaft 106 while the first pawl 122 ratchets along the inner toothed portion 110 of drive gear 108. Thus, performing a reverse reset motion while the selector 94 is in the first position prevents the output member 90 from transferring reverse driving torque to the nut, thus avoiding loosening the nut while performing the reverse reset motion.

Figure 24:
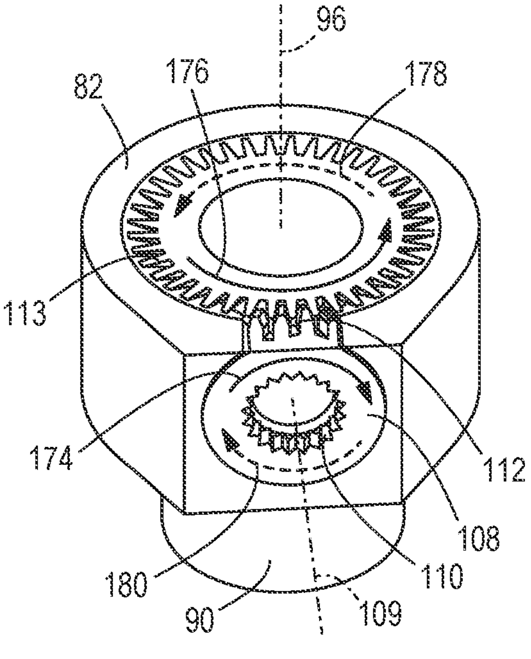
FIG. 24 is a cross-sectional view of the ratchet tool of FIG. 13, with a selector in a second position.

In operation, when an operator wishes to loosen a nut and drive the output member 90 of the ratchet tool 78 in a reverse direction, the operator rotates the selector 94 to the second position, resulting in the second pawl 126 engaging with the inner toothed portion 110 of the drive gear 108 and the first pawl 122 disengaging the inner toothed portion 110. The operator then actuates the motor 98 in a second "reverse" direction, causing the drive shaft 106 to rotate counterclockwise as viewed in FIGS. 21-23 and indicated by arrow 170 in FIG. 23, causing the selector 94 to rotate therewith. Because the second pawl 126 is engaged with the inner toothed portion 110 of the drive gear 108, the drive gear 108 rotates about the drive axis 109 in the same direction as the drive shaft 106, as indicated by arrow 172 in FIG. 23 and arrow 174 in FIG. 24. This causes the output member 90 to rotate counter-clockwise ("reverse") relative to housing 82, as viewed in FIG. 13 and indicated by arrow 176 in FIG. 24.

At some point, the operator may wish to manually loosen the nut without using the powered drive mechanism 86. Thus, the operator will perform a reverse driving motion by rotating the housing 82 counter-clockwise about the output axis 96 as indicated by the arrow 166 in FIG. 13. Because the selector 94 is in the second position and the second pawl 126 is engaged with the inner toothed portion 110 of drive gear 108, drive gear 108 is prevented from rotating clockwise, as viewed in FIG. 23, relative to the stationary drive shaft 106. Thus, as the housing 82 is rotated counter-clockwise, the output member 90 is prevented from rotating clockwise relative to housing 82, and instead is caused to rotate counter-clockwise with the housing 82 as indicated by arrow 166 in FIG. 13. Thus, performing a reverse driving motion while the selector 94 is in the second position allows an operator to use the output member 90 to transfer reverse driving torque to the nut to manually loosen a nut.

After a reverse driving motion, the operator needs to perform a forward reset motion by rotating the housing 82 clockwise about the output axis 96, as indicated by arrow 162 in FIG. 13, before beginning another reverse driving motion. Rotation of the housing 82 in a clockwise direction causes the output member 90 to rotate counter-clockwise relative to housing 82, as indicated by arrow 178 in FIG. 24, as the output member 90 remains fixed on the fastener and the housing 82 rotates clockwise about the fastener. Because the selector 94 is in the second position, the drive gear 108 is allowed to rotate clockwise about the drive axis 109, as indicated by arrow 180 in FIG. 24 (or clockwise about the drive axis 109, as indicated by arrow 182 in FIG. 23), relative to the stationary drive shaft 106 while the second pawl 126 ratchets along the inner toothed portion 110 of drive gear 108. Thus, performing a forward reset motion while the selector 94 is in the second position prevents the output member 90 from transferring forward driving torque to the nut, thus avoiding tightening the nut while performing the forward reset motion.

Figure 28:
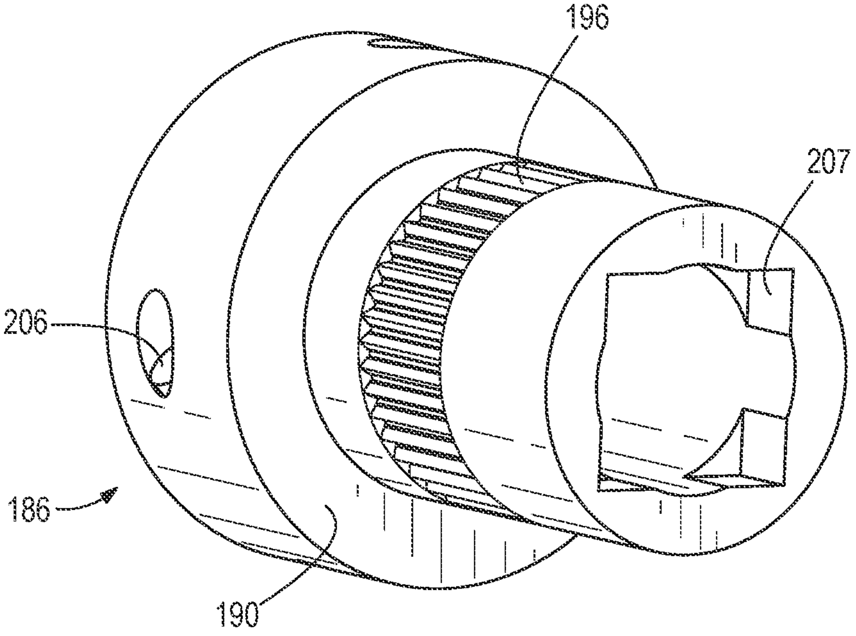
FIG. 28 is a perspective view of the output member assembly of FIG. 25.

As shown in FIGS. 25-28, an output member assembly 186 of a ratchet tool, such as the powered ratchet tools 10 or 78, includes an output member 190 and an insert 194. The output member 190 has an outer toothed portion 196, similar to toothed portion 50 of output member 22 in FIG. 2, and a first opening 198 in which the insert 194 is removably received. The first opening 198 has a first shape and a first size. The insert 194 has a second opening 202 with a second shape and a second size. In the illustrated embodiment, the second shape of the second opening 202 is different than the first shape of the first opening 198. For example, in the illustrated embodiment, the first shape of the first opening 198 is an 8-point double square shape and the second shape of the second opening is a 12-point double hexagon shape. However, in other embodiments, the second shape can be the same as the first shape, but the second size is smaller than the first size. As shown in FIG. 28, the output member 190 includes a third opening 207 that is opposite and coaxial with the first opening 198, and has a different shape (a square drive shape) than the first opening 198. In other embodiments, the third opening has the same shape as the first opening 198 but has a different size. With continued reference to FIGS. 25-28, the output member assembly 186 also includes a pair of locking members 206 and the insert 194 includes a pair of grooves 210 bounded by first and second ledges 214, 218. In the embodiment illustrated in FIGS. 25-28, the locking members 206 are pins having annular flanges 208.

Figure 26:
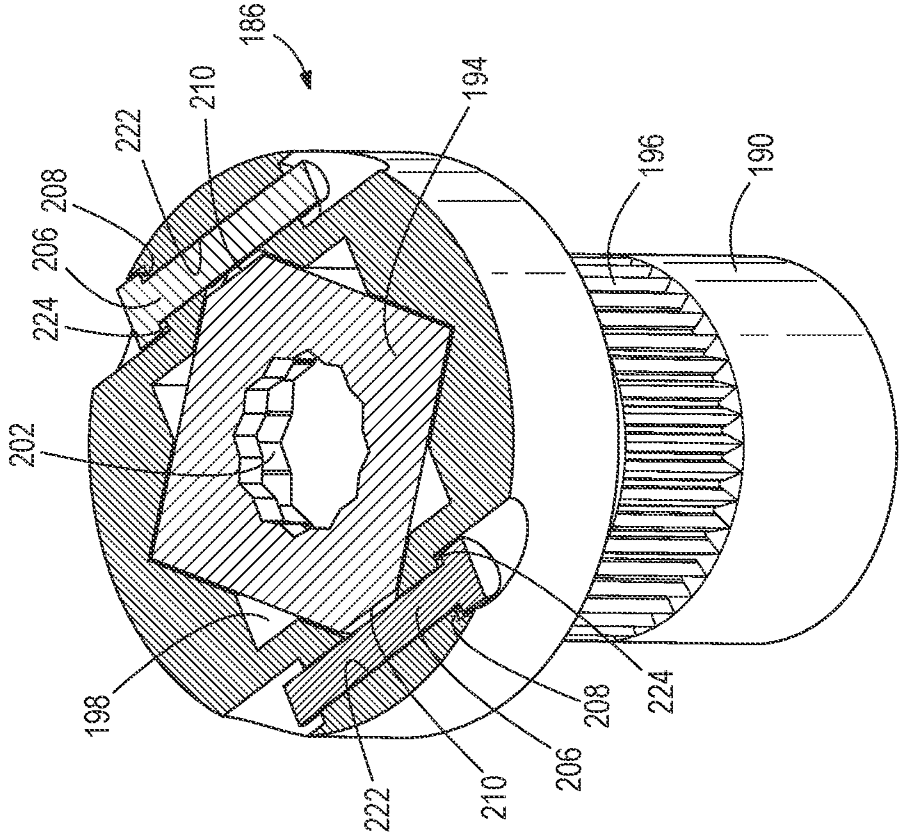
FIG. 26 is a cross-sectional view of the output member assembly of FIG. 25.
Figure 25:
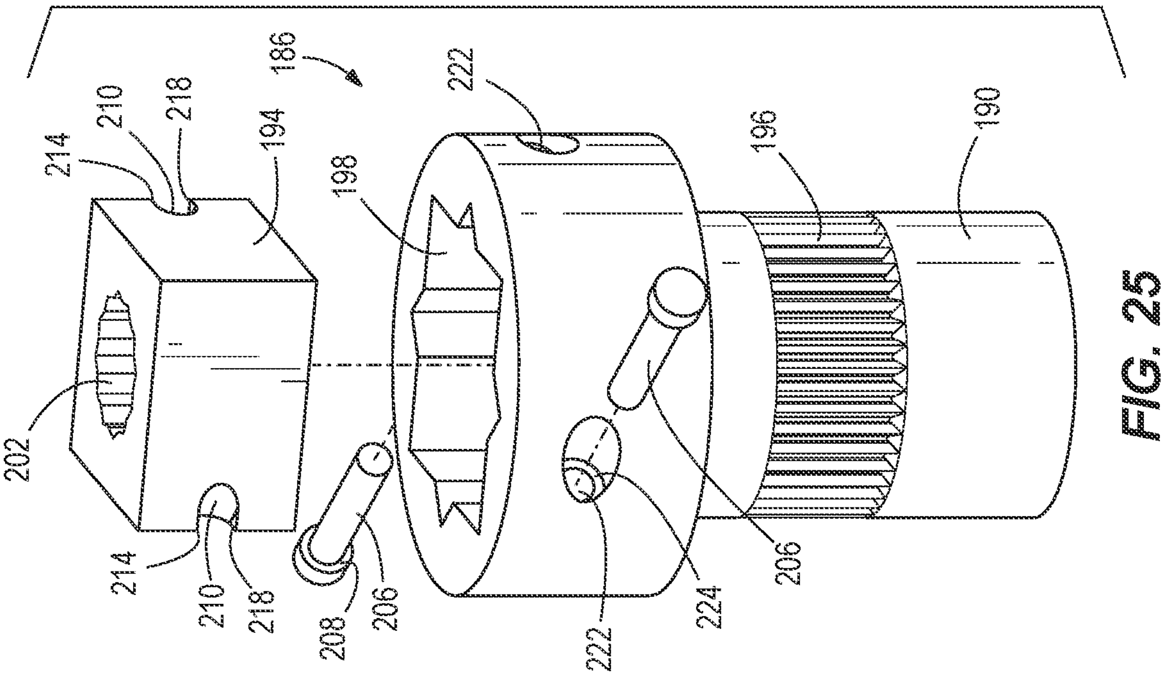
FIG. 25 is an exploded view of an output member assembly for a ratchet tool.
Figure 27:
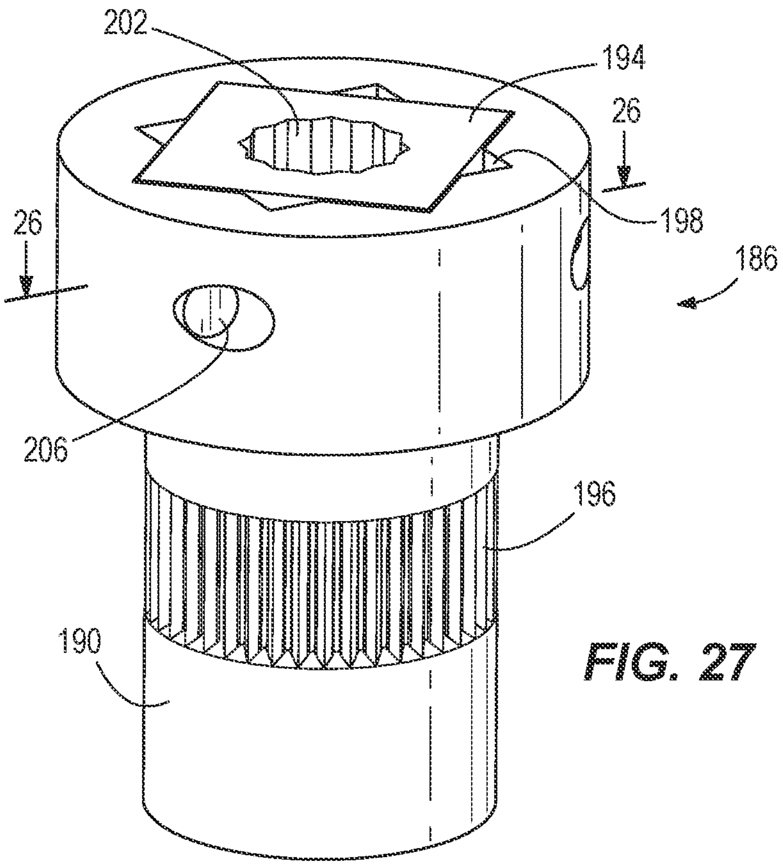
FIG. 27 is a perspective view of the output member assembly of FIG. 25.

In operation, the first opening 198 of the output member 190 may not be the appropriate shape or size for the particular fastener on which the operator desires to perform a driving operation. In this situation, the operator can simply install the insert 194 into the first opening 198. In order to install the insert 194, the operator first places the insert 194 into the first opening 198, at which point the grooves 210 are aligned with two bores 222 extending perpendicular to and located on opposite sides of the first opening 198. As shown in FIG. 26, the two bores 222 are parallel to one another and include annular shoulders 224. The operator then inserts the two locking members 206 into the respective bores 222 until they are secured with a nominal friction fit, such that the locking members 206 are received in the respective grooves 210 of the insert 194. As shown in FIG. 26, the annular flanges 208 of the locking members 206 abut the shoulders 224 in the bores 222 when the locking members 206 are inserted into the bores 222, thereby limiting the extent to which the locking members 206 can be inserted into the bores 222. After the locking members 206 have been inserted into the bores 222 and through the grooves 210, the first and second ledges 214, 218 are respectively arranged on opposite sides of the locking members 206. Thus, the insert 194 is secured within the output member 190 because the second ledges 218 of the grooves 210 prevent the insert 194 from slipping out, as the second ledges 218 would be caught on the locking members 206. Thus, absent an external force being applied to the locking members 206 to remove them from the bores 222, thus removing them from grooves 210, the insert 194 will be retained in the first opening 198. The operator is now able to use the ratchet tool to work on fasteners having the second shape and second size of the second opening 202.

Figure 29:
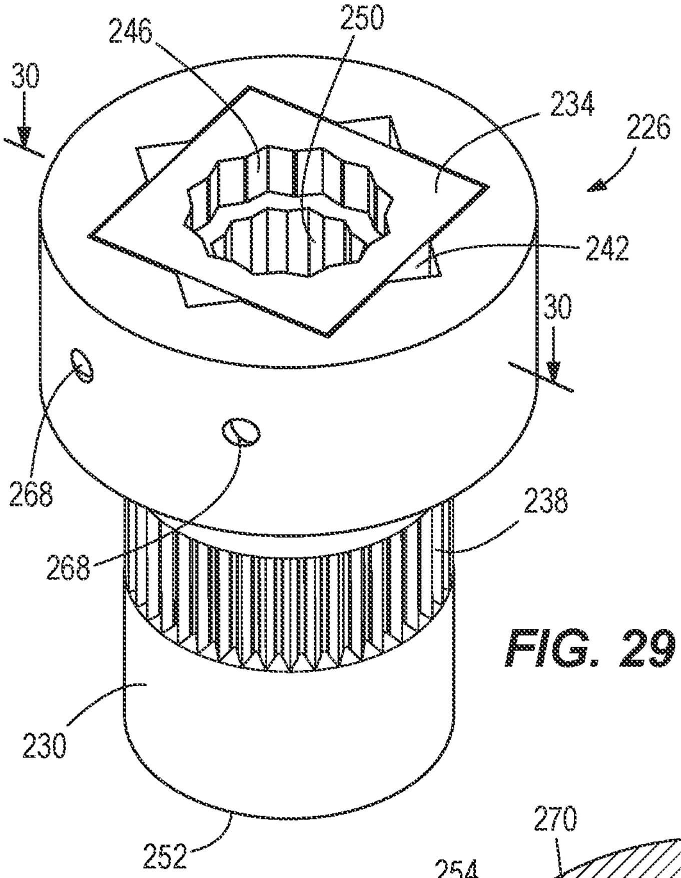
FIG. 29 is a perspective view of another embodiment of an output member assembly for a ratchet tool.
Figure 30:
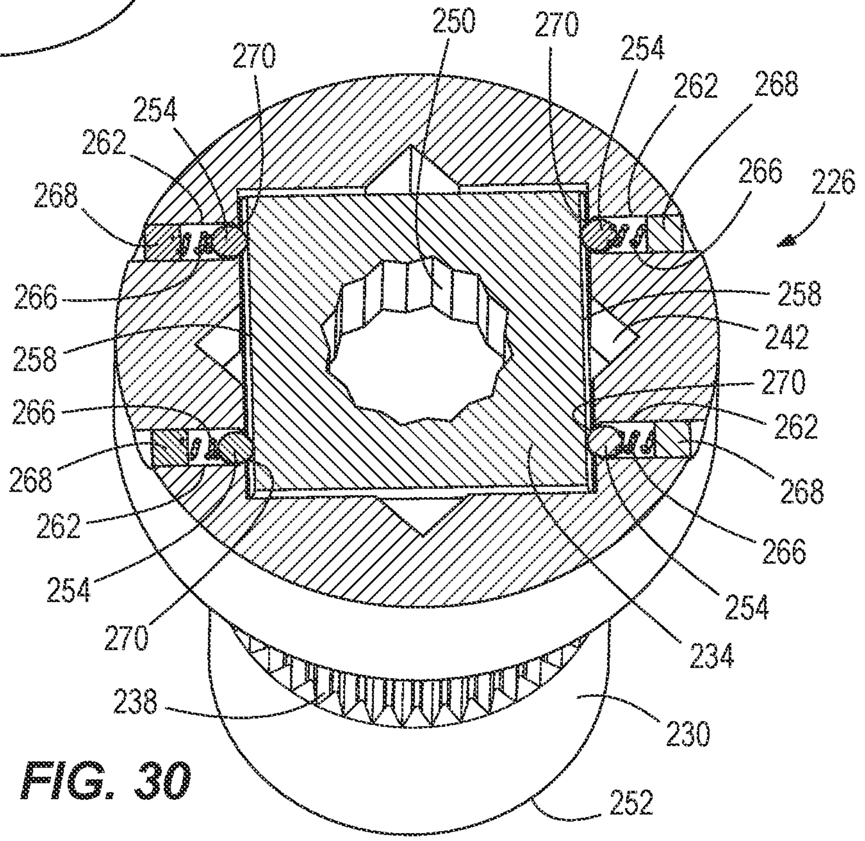
FIG. 30 is a cross-sectional view of the output member assembly of FIG. 29.
Figure 31:
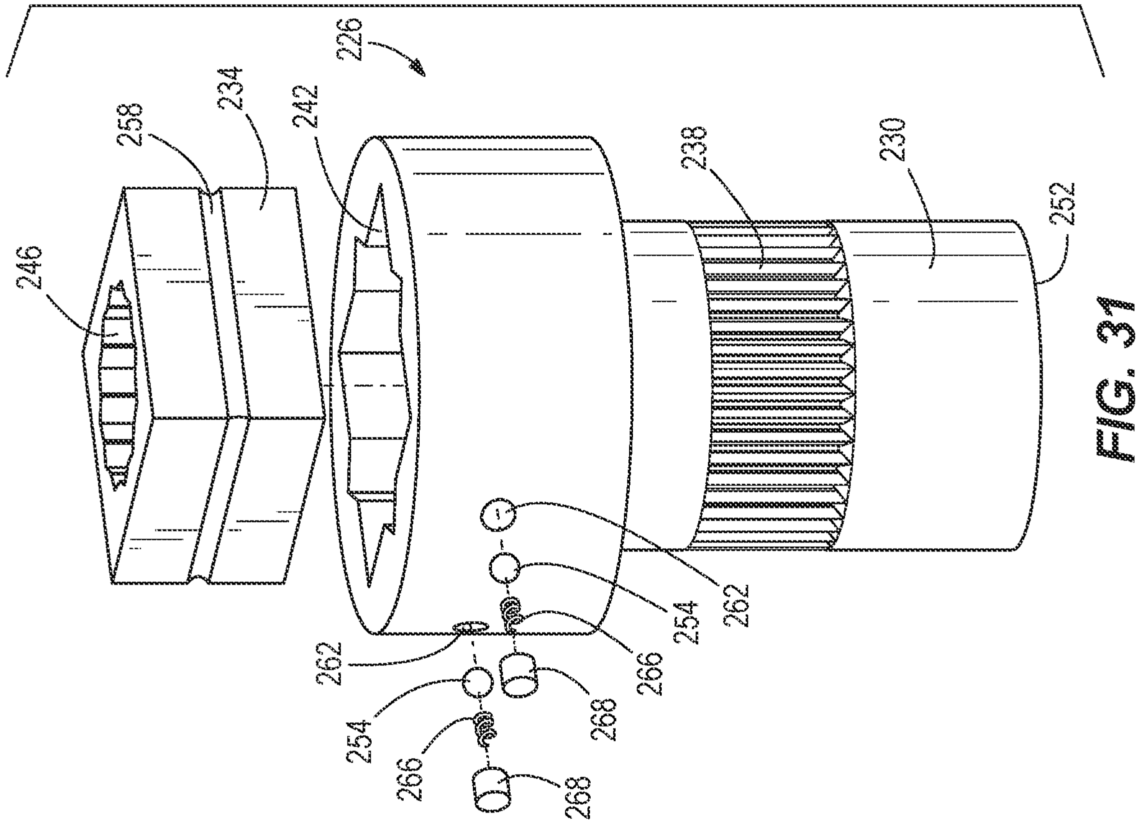
FIG. 31 is an exploded view of the output member assembly of FIG. 29.

As shown in FIGS. 29-31, a different embodiment of an output member assembly 226 of a ratchet tool, such as the powered ratchet tools 10 or 78, includes an output member 230 and an insert 234. The output member 230 has an outer toothed portion 238, similar to toothed portion 50 of output member 22 in FIG. 2, and a first opening 242 in which the insert 234 is removably received. The first opening 242 has a first shape and a first size. The insert 234 has a second opening 246 with a second shape and a second size. In the illustrated embodiment, the second shape of the second opening 246 is different than the first shape of the first opening 242. For example, in the illustrated embodiment, the first shape of the first opening 198 is an 8-point double square shape and the second shape of the second opening 246 is a 12-point double hexagon shape. However, in other embodiments, the second shape can be the same as the first shape, but the second size is smaller than the first size. As shown in FIG. 29, the insert 234 includes a third opening 250 that is adjacent and coaxial with the second opening 246. The third opening 250 has a third shape and a third size. In the illustrated embodiment, the third shape is the same as the second shape and the third size is smaller than the second size. However, in other embodiments, the third shape is different from the second shape and different from the first shape, or different from the second shape and the same as the first shape. The output member 230 also includes a fourth opening at an end 252 opposite the first opening 242. Like the third opening 207 of output member 190, the fourth opening of the output member 230 is opposite and coaxial with the first opening 242, and has a different shape (e.g. a square drive shape) than the first opening 242. In other embodiments, the fourth opening has the same shape as the first opening 242 but has a different size.

With continued reference to FIGS. 29-31, the output member assembly 226 also includes a plurality of locking members 254 arranged in the output member 230 and the insert 234 includes a peripheral groove 258 that continuously extends around the insert 234. In the embodiment of FIGS. 29-31, the locking members 254 are spherical detents within bores 262 that are biased toward the first opening 242 by springs 266 seated on plugs 268 within the bores 262. The bores 262 intersect the first opening 242 at ends 270 and each of the bores 262 is either parallel to or coaxial with each of the other bores 262. The ends 270 of bores 262 have nominally smaller diameters than the diameters of locking members 254, such that a portion of each locking member 254 protrudes into the first opening 242, but the locking members 254 are prevented from slipping out of bores 262.

In operation, the first opening 242 of the output member 230 may not be the appropriate shape or size for the particular fastener on which the operator desires to perform a driving operation. In this situation, the operator can simply install the insert 234 into the first opening 242. In order to install the insert 194, the operator moves the insert 194 into the first opening 242. While the insert 194 is being moved into the first opening 242, the locking members 254 are pushed away from the first opening 242 by the insert 194 until the groove 258 is aligned with the locking members 254, at which point the locking members 254 are biased through the ends 270 and into the groove 258. At this point, absent an external force being applied to the insert 234 to remove it from the first opening 242, the insert 234 will be retained in the first opening 242. The operator is now able to use the ratchet tool to work on fasteners having the second shape and second size of the second opening 246 or fasteners having the third shape and third size of the third opening 250.

Figure 32:
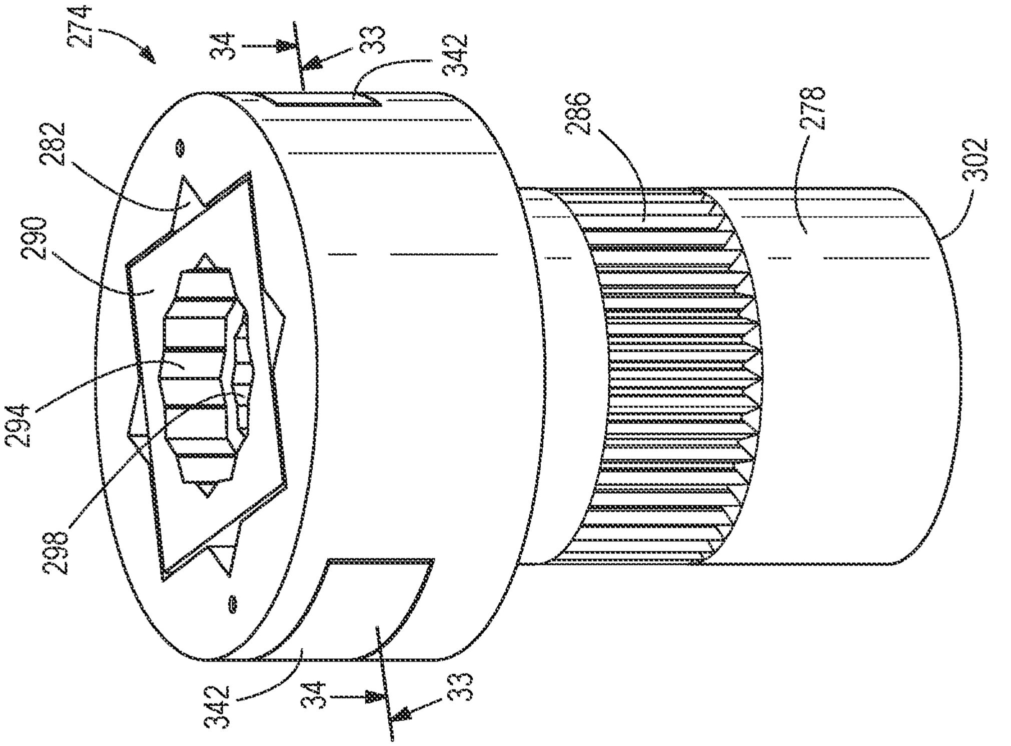
FIG. 32 is a perspective view of another embodiment of an output member assembly for a ratchet tool.
Figure 33:
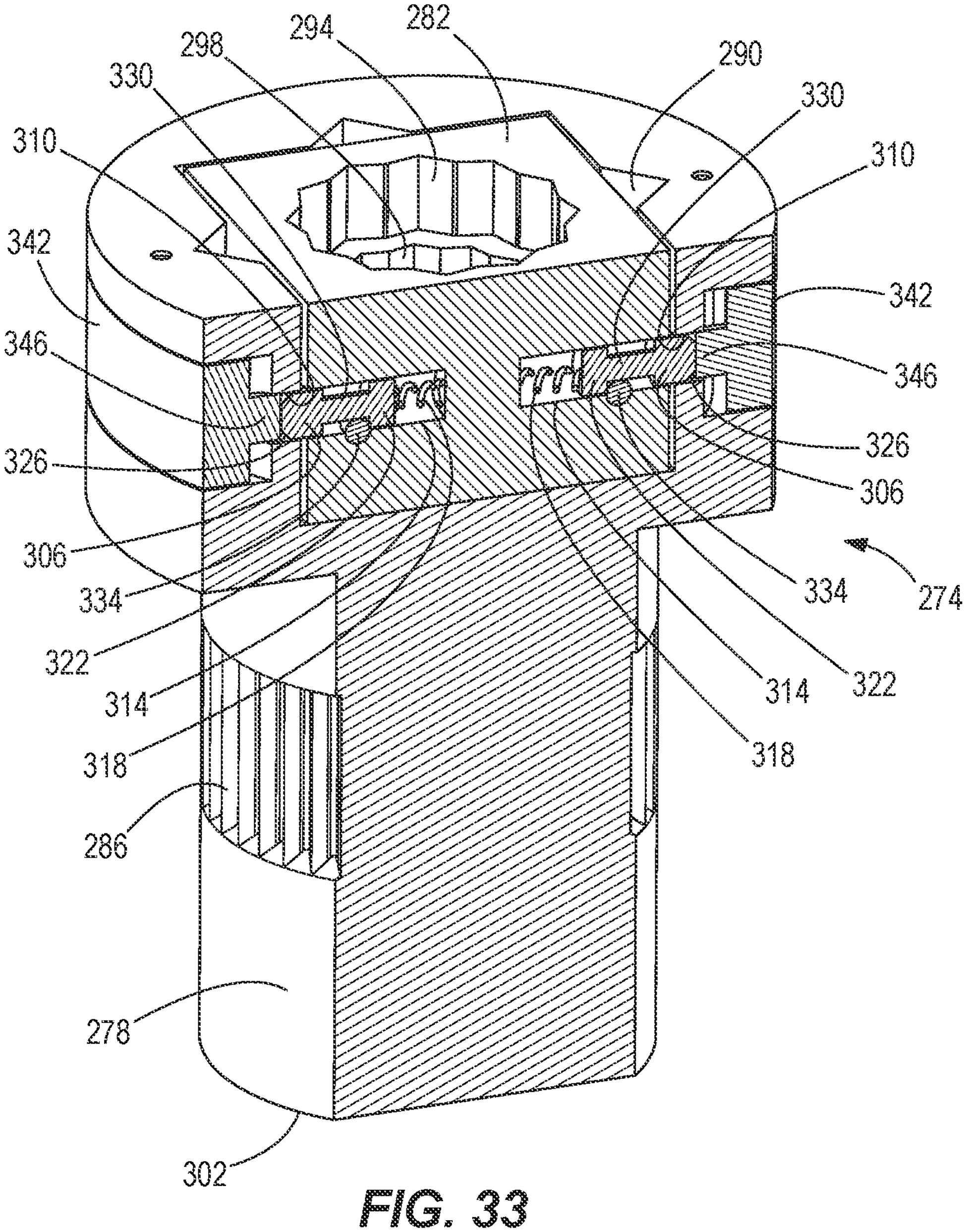
FIG. 33 is a cross-sectional view of the output member assembly of FIG. 32.

As shown in FIGS. 32-36, a different embodiment of an output member assembly 274 of a ratchet tool, such as the powered ratchet tools 10 or 78, includes an output member 278 and an insert 282. The output member 278 has an outer toothed portion 286, similar to toothed portion 50 of output member 22 in FIG. 2, and a first opening 290 in which the insert 282 is removably received. The first opening 290 has a first shape and a first size. The insert 282 has a second opening 294 with a second shape and a second size. In the illustrated embodiment, the second shape of the second opening 294 is different than the first shape of the first opening 290. For example, in the illustrated embodiment, the first shape of the first opening 290 is an 8-point double square shape and the second shape of the second opening 294 is a 12-point double hexagon shape. However, in other embodiments, the second shape can be the same as the first shape, but the second size is smaller than the first size. As shown in FIGS. 32 and 33, the insert 282 includes a third opening 298 that is adjacent and coaxial with the second opening 294. The third opening 298 has a third shape and a third size. In the illustrated embodiment, the third shape is the same as the second shape and the third size is smaller than the second size. However, in other embodiments, the third shape is different from the second shape and different from the first shape, or different from the second shape and the same as the first shape. The output member 278 also includes a square drive (not shown) at an end 302 opposite the first opening 290.

Figure 34:
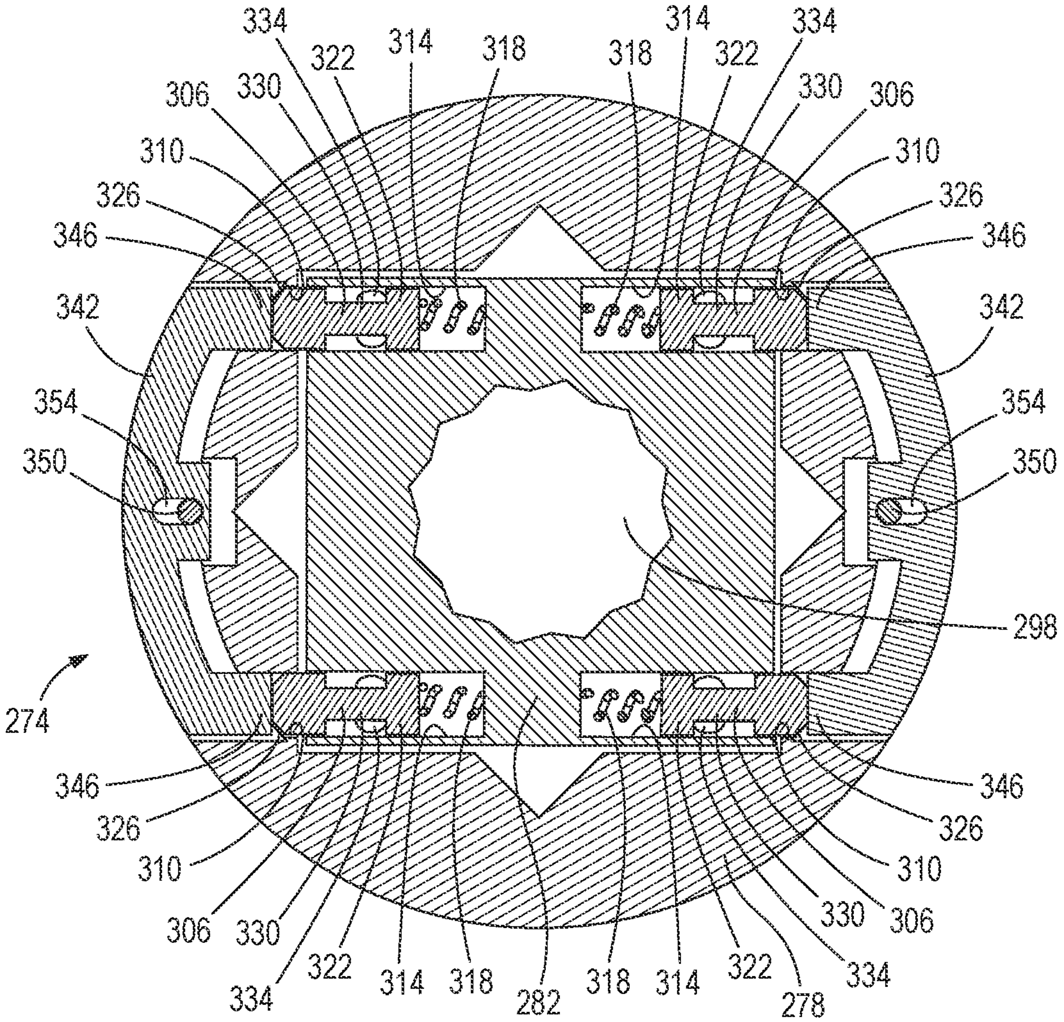
FIG. 34 is a cross-sectional view of the output member assembly of FIG. 32.
Figure 35:
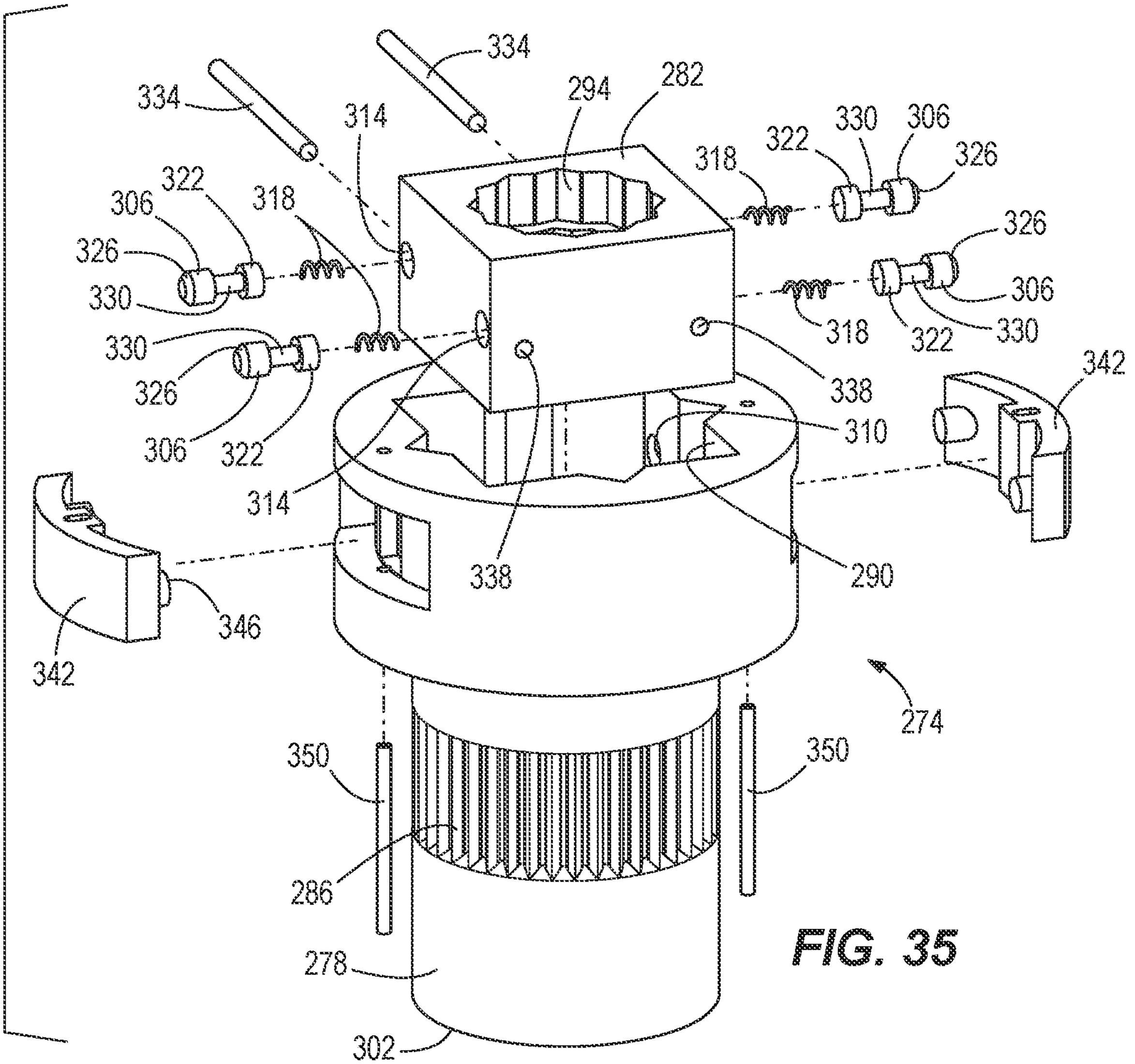
FIG. 35 is an exploded view of the output member assembly of FIG. 32.
Figure 36:
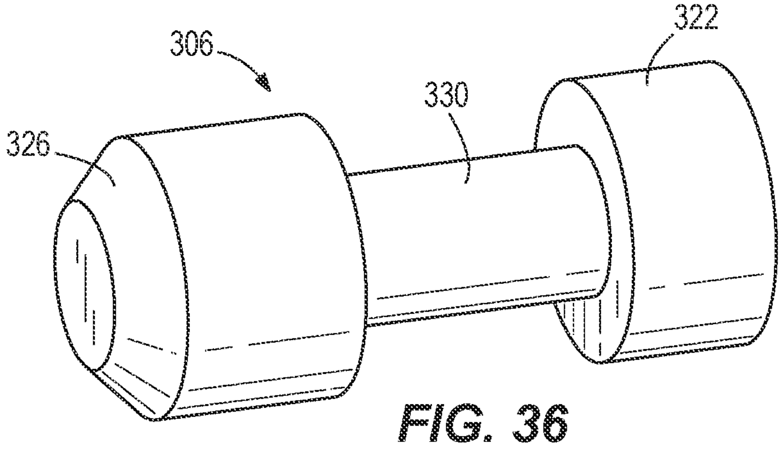
FIG. 36 is a perspective view of a locking member of the output member assembly of FIG. 32.

With reference to FIGS. 33-36, the output member assembly 274 also includes a plurality of locking members 306 arranged in the insert 282 and the output member 278 includes a plurality of grooves 310 defined as bores within output member 278. In the embodiment of FIGS. 32-36, the locking members 306 are detents within detent bores 314 that are biased out of the insert 282 by springs 318. As shown in FIG. 34, each of the detent bores 314 is coaxial with or parallel to each of the other detent bores 314. As shown in FIG. 36, each locking member 306 has a cylindrical end 322 and an opposite frustoconical end 326 connected to the cylindrical end 322 by an intermediate portion 330 that has a smaller diameter than the cylindrical end 322. As shown in FIGS. 33-35, the insert 282 includes two cross pins 334 arranged in cross bores 338 that extend perpendicular to and intersect detent bores 314. Thus, the locking members 306 are prevented from slipping out of the insert 282 because the cross pins 334 catch the cylindrical end 322 of each locking member 306 with the detent bore 314.

As shown in FIGS. 32-35, the output member 278 includes two unlocking actuators 342, each of which includes two legs 346 arranged in the grooves 310 of the output member 278. The unlocking actuators 342 are respectively retained in the output member 278 by longitudinal pins 350 extending through the output member 278 and through slots 354 of the unlocking actuators 342. As explained in further detail below, the unlocking actuators 342 are each moveable between a radially outward locked position and a radially inward unlocked position.

In operation, the first opening 290 of the output member 278 may not be the appropriate shape or size for the particular fastener on which the operator desires to perform a driving operation. In this situation, the operator can simply install the insert 282 into the first opening 290. In order to install the insert 282, the operator moves the insert 282 into the first opening 290. While the insert 282 is being moved into the first opening 290, the locking members 306 are pushed into the detent bores 314 of the insert 282 by the output member 278 until the locking members 306 are aligned within the grooves 310, at which point the locking members 306 are biased into the grooves 310, as shown in FIGS. 33 and 34. Once biased into grooves 310, the locking members 306 push the legs 346 of the unlocking actuators 342 and move the unlocking actuators 342 to their radially outward, locked positions. At this point, absent an external force being applied to the locking members 306, the insert 282 will be retained in the first opening 290. The operator is now able to use the ratchet tool to work on fasteners having the second shape and second size of the second opening 294 or fasteners having the third shape and third size of the third opening 298. When an operator wishes to remove the insert 282 from the first opening 290, the operator presses the unlocking actuators 342 radially inward to move them to their radially inward unlocked positions, in which the legs 346 move the locking members 306 out of the grooves 310, such that the insert 282 can then be removed from the first opening 290.

Various features of the invention are set forth in the following claims.

What is claimed is:

1. A powered ratchet tool comprising:

a housing;

an output member having a toothed surface, the output member defining an output axis;

a drive mechanism for driving the output member, the drive mechanism including a yoke in which the output member is arranged;

a first pawl in the yoke and biased toward the toothed surface of the output member;

a second pawl in the yoke and biased toward the toothed surface of the output member; and a selection ring having a circumferential wall arranged between the yoke and the toothed surface of the output member, the circumferential wall having a first window and a second window, the selection ring moveable between a first position and a second position, and a tab extending radially outward in a direction perpendicular to the output axis from the circumferential wall and the housing for moving the selection ring between the first and second positions, wherein when the selection ring is in the first position, the first pawl extends through the first window to engage the toothed surface of the output member and the second pawl is blocked by the circumferential wall, such that the second pawl does not engage with the toothed surface of the output member, and wherein when the selection ring is in the second position, the second pawl extends through the second window to engage the toothed surface of the output member and the first pawl is blocked by the circumferential wall, such that the first pawl does not engage with the toothed surface of the output member.

2. The powered ratchet tool of claim 1, further comprising a first spring biasing the first pawl toward the toothed surface of the output member.

3. The powered ratchet tool of claim 2, further comprising a second spring biasing the second pawl toward the toothed surface of the output member.

4. The powered ratchet tool of claim 3, wherein the first and second springs are arranged in the yoke.

5. The powered ratchet tool of claim 1, wherein the drive mechanism includes a motor and a transmission terminating in a crankshaft having a drive bushing arranged eccentrically on an end of the crankshaft, the drive bushing arranged in a recess in the yoke, such that when the crankshaft rotates, the drive bushing pivots the yoke in a reciprocating manner relative to the selection ring.

6. The powered ratchet tool of claim 1, wherein the output member includes a first opening with a first shape, and wherein the powered ratchet tool further comprises an insert configured to be removably positioned in the first opening, the insert having a second opening with a second shape that is different than the first shape, and a locking member in one of the output member or the insert, the other of the output member or the insert including a groove configured to receive the locking member when the insert is received in the first opening, such that the insert is retained in the first opening absent an external force being applied to the insert or the locking member.

7. The powered ratchet tool of claim 6, wherein the locking member is in the output member, and wherein the insert includes the groove.

8. The powered ratchet tool of claim 7, wherein the locking member is a pin that is removably inserted into a bore of the output member, and wherein when the insert is received in the first opening, the groove is aligned with the bore, such that after the insert has been received in the first opening, the pin is insertable into the bore and through the groove.

9. The powered ratchet tool of claim 8, wherein the locking member is spring-biased detent that is arranged in a bore of the output member, and wherein when the insert is received in the first opening, the groove is aligned with the bore, such that after the insert has been received in the first opening, the spring-biased detent is biased into the groove.

10. The powered ratchet tool of claim 6, wherein the locking member is a spring-biased detent.

11. The powered ratchet tool of claim 6, wherein the second opening has a first size, and wherein the insert includes a third opening adjacent and coaxial with the second opening, the third opening having the second shape and a second size that is different than the first size.

12. The powered ratchet tool of claim 1, wherein the output member includes a first opening with a first shape having a first size, and wherein the powered ratchet tool further comprises an insert configured to be removably positioned in the first opening, the insert having a second opening with the first shape and a second size that is different than the first size, and a locking member in one of the output member or the insert, the other of the output member or the insert member including a groove configured to receive the locking member when the insert is received in the first opening, such that the insert is retained in the first opening absent an external force being applied to the insert or the locking member.

13. The powered ratchet tool of claim 12, wherein the locking member is in the output member, and wherein the insert includes the groove.

14. The powered ratchet tool of claim 13, wherein the locking member is a pin that is removably inserted into a bore of the output member, and wherein when the insert is received in the first opening, the groove is aligned with the bore, such that after the insert has been received in the first opening, the pin is insertable into the bore and through the groove.

15. The powered ratchet tool of claim 13, wherein the locking member is spring-biased detent that is arranged in a bore of the output member, and wherein when the insert is received in the first opening, the groove is aligned with the bore, such that after the insert has been received in the first opening, the spring-biased detent is biased into the groove.

16. The powered ratchet tool of claim 12, wherein the locking member is a spring-biased detent.

17. The powered ratchet tool of claim 12, wherein the insert includes a third opening adjacent and coaxial with the second opening, the third opening having the first shape and a third size that is different than the first size and the second size.

18. A powered ratchet tool comprising:

a housing;

an output member defining an output axis;

a drive gear for driving the output member, the drive gear defining a drive axis that is transverse to the output axis, the drive gear having an inner toothed surface;

a drive mechanism for driving the drive gear, the drive mechanism including a drive shaft arranged along the drive axis;

a first pawl in the drive shaft and biased toward the inner toothed surface of the drive gear;

a second pawl in the drive shaft and biased toward the inner toothed surface of the drive gear;

a selection ring arranged about the drive shaft and including an inner circumferential wall having a first pawl recess and a second pawl recess, the selection ring moveable between a first position and a second position, and a tab extending radially outward in a direction perpendicular to the output axis from the circumferential wall and the housing for moving the selection ring between the first and second positions, wherein when the selection ring is in the first position, the first pawl is biased into engagement with the first pawl recess and the inner toothed surface of the drive gear, and the second pawl is blocked by the inner circumferential wall, such that the second pawl does not engage with the inner toothed surface of the drive gear, and wherein when the selection ring is in the second position, the second pawl is biased into engagement with the second pawl recess and the inner toothed surface of the drive gear, and the first pawl is blocked by the inner circumferential wall, such that the first pawl does not engage with the inner toothed surface of the drive gear.

19. The powered ratchet tool of claim 18, wherein the drive shaft includes a pin and the selection ring includes a first detent and a second detent, and wherein when the selection ring is in the first position, the pin is biased into the first detent, such that the selection ring is maintained in the first position, and wherein the when the selection ring is in the second position, the pin is biased into the second detent, such that the selection ring is maintained in the second position.

20. The powered ratchet tool of claim 18, further comprising a first spring biasing the first pawl toward the toothed surface of the output member.

* * * * *